(12) United States Patent
Furuya

(10) Patent No.: US 11,597,595 B2
(45) Date of Patent: Mar. 7, 2023

(54) ARTICLE STORAGE FACILITY AND METHOD OF CONTROLLING ARTICLE TRANSPORTATION

(71) Applicant: DAIFUKU CO., LTD., Nishiyodogawa-ku (JP)

(72) Inventor: Haruhito Furuya, Tokyo (JP)

(73) Assignee: DAIFUKU CO., LTD., Nishiyodogawa-ku (JP)

( * ) Notice: Subject to any disclaimer, the term of this patent is extended or adjusted under 35 U.S.C. 154(b) by 232 days.

(21) Appl. No.: 17/073,643

(22) Filed: Oct. 19, 2020

(65) Prior Publication Data

US 2021/0130088 A1    May 6, 2021

(30) Foreign Application Priority Data

Nov. 1, 2019    (JP) .............................. JP2019-200279

(51) Int. Cl.
    B65G 1/04    (2006.01)
(52) U.S. Cl.
    CPC ......... B65G 1/0428 (2013.01); B65G 1/0421 (2013.01)
(58) Field of Classification Search
    CPC ............................ B65G 1/0421; B65G 1/0428
    See application file for complete search history.

(56) References Cited

U.S. PATENT DOCUMENTS 6,923,612 B2 *  8/2005  Hansl ................... B65G 1/0435
                                                          414/280
9,764,900 B2 *  9/2017  Grosse ....................... B60L 5/40
9,944,464 B2 *  4/2018  Ueda .................... B65G 1/0407
(Continued)

FOREIGN PATENT DOCUMENTS

JP          10-152207 A      8/1998
JP       2004-345838 A      12/2004
(Continued)

OTHER PUBLICATIONS

Search Report dated Nov. 12, 2021 in corresponding Singaporean Patent Application No. 102020103378 citing documents AA, AB, AO and AP therein, 4 pages
(Continued)

*Primary Examiner* — Jonathan Snelting
(74) *Attorney, Agent, or Firm* — Oblon, McClelland, Maier & Neustadt, L.L.P.

(57) ABSTRACT

An article storage facility includes: storage compartments, each including a first storage spot configured to store a first article; and a second storage spot configured to store the first article; a first transportation mechanism including a first support configured to support and transport the first article, the first transportation mechanism being configured to transport the first article between: each one of the first and the second storage spots; and a first support spot where the first article is supported by the first support; a second transportation mechanism including a second support configured to support and transport the first article, the second transportation mechanism being configured to transport the first article between: each one of the first and the second storage spots; and a second support spot where the first article is supported by the second support; and a controller configured to control transportation of the first article.

7 Claims, 12 Drawing Sheets

(56) References Cited

U.S. PATENT DOCUMENTS

| | | | |
|---|---|---|---|
| 9,994,394 B2* | 6/2018 | Masuda | ............... B65G 1/0421 |
| 2016/0167879 A1 | 6/2016 | Masuda | |
| 2016/0297610 A1 | 10/2016 | Grosse | |
| 2018/0134488 A1 | 5/2018 | Grosse et al. | |

FOREIGN PATENT DOCUMENTS

| JP | 2006-248690 A | 9/2006 |
|---|---|---|
| JP | 4084240 B2 | 4/2008 |
| JP | 2009-143651 A | 7/2009 |
| JP | 2013-23302 A | 2/2013 |
| JP | 2018-71189 A | 5/2018 |

OTHER PUBLICATIONS

Japanese Decision to Grant a Patent issued in Japanese Patent Application No. 2019-200279 dated Nov. 1, 2022, (w/ English Translation).

\* cited by examiner

ARTICLE STORAGE FACILITY AND METHOD OF CONTROLLING ARTICLE TRANSPORTATION

The present application claims priority to and incorporates by reference the entire contents of Japanese Patent Application No. 2019-200279 filed in Japan on Nov. 1, 2019.

BACKGROUND

The present disclosure relates to an article storage facility and a method of controlling article transportation.

In the related art, there has been known an article storage facility including a plurality of storage compartments that are provided along a transportation path in which a transportation mechanism moves, and in which each of the storage compartments has a first storage spot, and a second storage spot that is located on the opposite side of the transportation path, with respect to the first storage spot (for example, see Japanese Patent Application Laid-open No. 2018-71189). In this article storage facility, when an article is stored in the first storage spot, the article becomes an obstacle when another article is to be transported to or from the second storage spot. In this case, the transportation mechanism transports the article stored in the first storage spot to a predetermined evacuation spot, and transports the other article to or from the second storage spot. The spot to which the article is transported is allocated to one of the vacant storage compartments without articles.

Moreover, there has been known an article storage facility including: first and second transportation mechanisms; central storage compartments to which both of the first and second transportation mechanisms are capable of transporting articles; first storage compartments to which only the first transportation mechanisms is capable of transporting articles; and second storage compartments to which only the second transportation mechanism is capable of transporting articles (for example, Japanese Patent No. 4084240). In this article storage facility, to enable the first transportation mechanism to transport an article to or from one of the second storage compartments, and to enable the second transportation mechanism to transport an article to or from one of the first storage compartments, a relay spot is used. The relay spot is allocated to vacant one of the central storage compartments.

SUMMARY

The article storage facility including the first and second transportation mechanisms has a shortcoming that, if a storage compartment is reserved for the relay spot, independently from those used as the evacuation spots for the respective transportation mechanisms, the number of storage compartments available for the storage of the articles is reduced, and the maximum number of stored articles is also reduced.

There is a need for an article storage facility and a method of controlling article transportation capable of increasing the maximum number of stored articles in an article storage facility provided with two transportation mechanisms.

According to one aspect of the present disclosure, there is provided an article storage facility including: a plurality of storage compartments provided along a transportation path extending in a direction intersecting with a first direction, each of the plurality of storage compartments including a first storage spot configured to store a first article; and a second storage spot located on an opposite side of the transportation path with respect to the first storage spot in the first direction and configured to store the first article; a first transportation mechanism including a first support configured to support and transport the first article along the transportation path, the first transportation mechanism being configured to transport the first article between: each one of the first and the second storage spots; and a first support spot where the first article is supported by the first support in the transportation path; a second transportation mechanism including a second support configured to support and transport the first article along the transportation path, the second transportation mechanism being configured to transport the first article between: each one of the first and the second storage spots; and a second support spot where the first article is supported by the second support in the transportation path; and a controller configured to control transportation of the first article by the first transportation mechanism and the second transportation mechanism, wherein the controller is configured to allocate a third storage spot in one of the plurality of storage compartments to and from which both of the first transportation mechanism and the second transportation mechanism are able to transport the first article, as at least one of a first evacuation spot to which the first transportation mechanism evacuates a second article in a case where the second article is placed in the first storage spot located between the first support spot and the second storage spot when transporting the first article between the first support spot and the second storage spot by the first transportation mechanism, a second evacuation spot to which the second transportation mechanism evacuates the second article in a case where the second article is placed in the first storage spot located between the second support spot and the second storage spot when transporting the first article between the second support spot and the second storage spot by the second transportation mechanism, and a relay spot where the first article is supported while the first article is passed between the first transportation mechanism and the second transportation mechanism.

DETAILED DESCRIPTION

Figure 1:
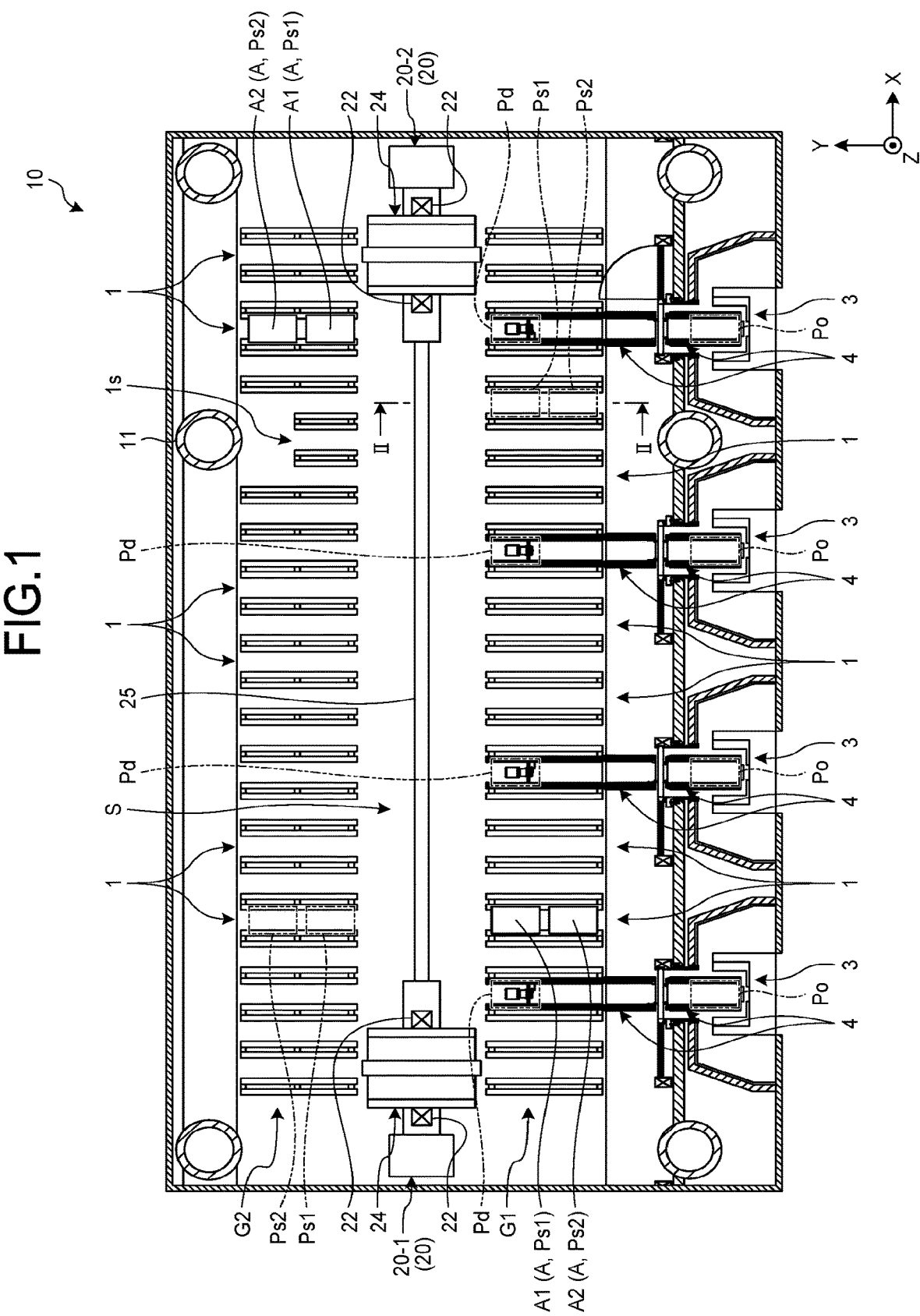
FIG. 1 is an exemplary plan view of a cemetery facility according to an embodiment.

An exemplary embodiment of the present disclosure will now be disclosed. The configurations according to the embodiment described below, and the actions and the results (effects) achieved by such configurations are merely exemplary. The present disclosure may be implemented in any configurations other than those described in the following embodiment. Furthermore, with the present disclosure, it is possible to achieve at least one of various effects (including secondary effects) achieved by the configurations described below.

The ordinal numbers herein are assigned for convenience, to distinguish parts or portions from one another, and not indicative of any priorities or orders.

In the drawings, directions with respect to a cemetery facility 10 are indicated with arrows. An X direction, a Y direction, and a Z direction intersect one another, and are perpendicular to one another. The Z direction extends substantially along the vertical direction, and the arrow Z points upwards in the vertical direction. The X direction and the Y direction substantially extend along the horizontal direction. The X direction may also be referred to as a left-and-right direction or a longitudinal direction, and the Y direction may also be referred to as a front-and-back direction or a short-hand direction. The Z direction may also be referred to as an up-and-down direction.

In the drawings, the reference numerals for indicating the positions of an article A are sometimes indicated in parenthesis, in a manner appended to the reference numeral indicating the article A.

Articles, Transportation Path, Storage Compartments, and Visitor's Booths

Figure 2:
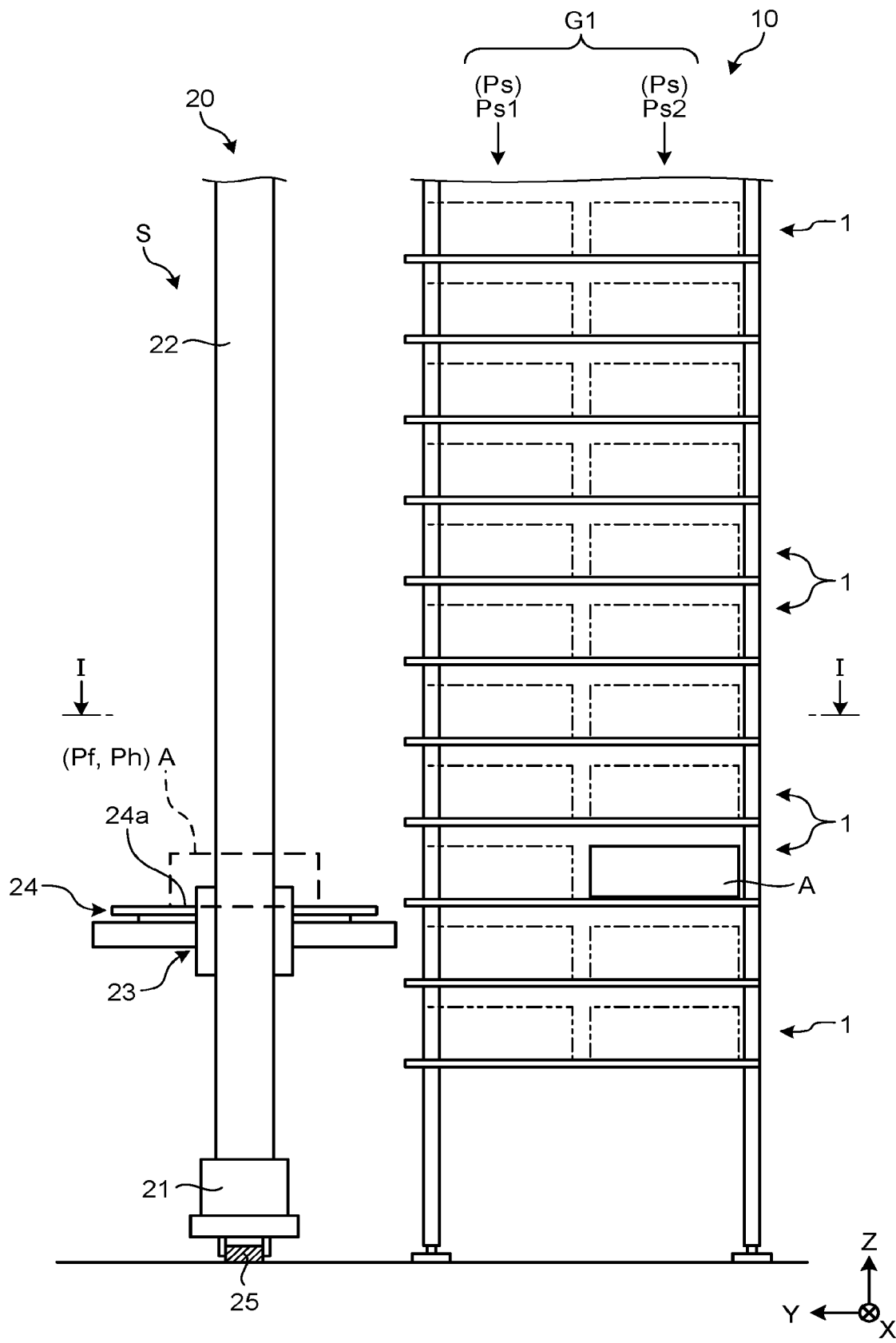
FIG. 2 is an exemplary side view of the cemetery facility according to the embodiment, across the line II-II in FIG. 1.

FIG. 1 is a plan view of the cemetery facility 10, looked in the direction opposite to the Z direction, across the line I-I in FIG. 2. FIG. 2 is a side view of a part of the cemetery facility 10, looked in the X direction, across the line II-II in FIG. 1.

The cemetery facility 10 illustrated in FIGS. 1 and 2 is one example of an article storage facility including a plurality of storage compartments 1 for storing therein articles A. In the cemetery facility 10, an article A is a container for storing therein items such as the remains of the dead, a cinerary urn storing therein ashes of the dead, belongings of the dead, or a mortuary tablet.

Each of the articles A has an identifier indicating identification information of the article A. A reader 51 (see FIG. 5) for acquiring the identification information is provided to a storage compartment 1, or to each storage spot Ps allocated to the storage compartment 1. The identifier is a label appended with a code, such as a barcode or a two-dimensional code, or a radio frequency identifier (RFID) tag retaining the identification information. The reader 51 is a code reader having a camera for capturing an image of the code, or an RFID reader for acquiring the identification information via wireless communication with the RFID tag, for example.

The cemetery facility 10 is provided with a transportation path S extending in a manner intersecting with the Y direction, as a space allowing the stacker cranes 20 to move and transport the article A. The transportation path S stretches in the X direction as well as in the Z direction, at a substantially constant width in the Y direction. In other words, the transportation path S extends in the X direction and the Z direction. The stacker cranes 20 are one example of a transportation mechanism for conveying the article A. The Y direction is one example of a first direction.

As illustrated in FIG. 1, the cemetery facility 10 is provided with a group of a plurality of storage compartments 1 (hereinafter, simply referred to as a first group G1) arranged along the transportation path S. On the opposite side of the first group G1, with respect to the transportation path S, another group of a plurality of storage compartments 1 (hereinafter, simply referred to as a second group G2) is provided.

On the opposite side of the second group G2 with respect to the transportation path S, a plurality of visitor's booths 3, and conveyors 4 for conveying the articles A between the visitor's booths 3 and the transportation path S are provided. The conveyor 4 is one example of a transportation mechanism for transporting the article A.

The visitor's booths 3 are arranged substantially at an equal interval, in a manner aligned in the X direction, on the opposite side of the transportation path S, with respect to the first group G1. Each of the visitor's booths 3 is provided with a reader 52 (see FIG. 5) for reading identification information of a visitor, from the RFID tag belonging to the visitor, via wireless communication.

The conveyors 4 are provided in a manner corresponding to the respective visitor's booths 3, and extend along the Y direction. The conveyors 4 penetrate through the first group G1 in the Y direction. The conveyor 4 may transport the article A between a delivery position Pd where the article A is passed, and a visiting position Po facing the visitor's booth 3 or the visiting position Po inside the visitor's booth 3.

There is no storage compartment 1 in the space where the conveyor 4 transports articles A. In the first group G1, the storage compartments 1 are arranged in a matrix, with rows arranged in the X direction, and columns arranged in the Z direction, except for the portions where the conveyors 4 are provided. To put it in other words, in the first group G1, the storage compartments 1 are arranged in both of the X direction and the Z direction.

In the second group G2, too, the storage compartments 1 are arranged in a matrix, with rows arranged in the X direction, and columns arranged in the Z direction, in the same manner as in the first group G1. To put it in other words, in the second group G2, too, the storage compartments 1 are arranged in both of the X direction and the Z direction. The storage compartments 1 in the first group G1 and those in the second group G2 are aligned along the Y direction, with the transportation path S interposed therebetween.

As illustrated in FIGS. 1 and 2, in each of the storage compartments 1 in the first group G1, a plurality of storage spots Ps are provided, in a manner aligned in the Y direction. Each of the storage spots Ps stores therein an article A. In each of the storage spots Ps, the article A is supported by two support members separated from each other in the X direction, with the two support members supporting the respective ends of the article A, for example.

In each of the storage compartments 1, the storage spot Ps closest to the transportation path S is one example of a first storage spot Ps1. The storage spot Ps positioned on the opposite side of the transportation path S in the Y direction, with respect the first storage spot Ps1, is one example of a second storage spot Ps2. In other words, the first storage spot Ps1 is closer to the transportation path S than the second storage spot Ps2 is, and the second storage spot Ps2 is further away from the transportation path S than the first storage spot Ps1 is. When there is no storage spot between the storage spot Ps and the transportation path S, the storage spot Ps corresponds to the first storage spot Ps1. When there is another storage spot between the storage spot Ps and the transportation path S, the storage spot Ps corresponds to the second storage spot Ps2.

In the storage compartments 1 of the second group G2, too, the storage spot Ps closest to the transportation path S corresponds to one example of the first storage spot Ps1, and the storage spot Ps further away from the transportation path S than the first storage spot Ps1 corresponds to one example of the second storage spot Ps2.

The second group G2 also includes some storage compartments 1s having only one storage spot Ps, in addition to the storage compartments 1 having a plurality of storage spots Ps aligned in the Y direction, in the same manner as the storage compartments 1 in the first group G1.

An interfering member 11 such as a pillar in the cemetery facility 10 is provided on the opposite side of the transportation path S, with respect to the storage compartments 1s in the second group G2. Therefore, the storage compartments 1s have no second storage spot Ps2 that interferes with the interfering member 11, and only have the first storage spot Ps1 not interfering with the interfering member 11.

In the first group G1, the first storage spots Ps1 are arranged in a matrix, with rows arranged in the X direction and columns arranged in the Z direction, and the second storage spots Ps2 are arranged in a matrix, with rows arranged in the X direction and columns arranged in the Z direction. In the second group G2, too, the first storage spots Ps1 are arranged in a matrix, with rows arranged in the X direction and columns arranged in the Z direction, and the second storage spots Ps2 are arranged in a matrix, with rows arranged in the X direction and columns arranged in the Z direction.

It is possible to configure the first group G1 to include the storage compartments is that are provided with only one storage spot Ps, or to configure the first group G1 and the second group G2 to also include some storage compartments that are provided with three or more storage spots Ps. Furthermore, the layout of the storage compartments 1, 1s, the visitor's booths 3, the conveyors 4, the stacker cranes 20, and the transportation path S is not limited to that disclosed in FIGS. 1 and 2.

Stacker Cranes

As illustrated in FIG. 1, the cemetery facility 10 includes the two stacker cranes 20 (20-1, 20-2). These two stacker cranes 20-1, 20-2 have the same structure. The stacker crane 20-1 is one example of a first transportation mechanism, and the stacker crane 20-2 is one example of a second transportation mechanism.

As illustrated in FIGS. 1 and 2, each of the stacker cranes 20 includes a running body 21, masts 22, a carriage 23, and a transfer device 24. A guide rail 25 extending in the X direction is provided to at least one of a bottom part or an upper part of the transportation path S. The stacker crane 20 may move along the guide rail 25 in the X direction.

The running body 21 is supported movably in the X direction by the guide rail 25. The two masts 22 extending in the Z direction are fixed to the running body 21, in a manner separated from each other in the X direction. The running body 21 and the masts 22 are enabled to move along the guide rail 25 in the X direction, by the rotation of a motor (not illustrated) serving as a driving source for moving the running body 21 and the masts 22 in the X direction, and also enabled to stop at a plurality of positions in the X direction, as the rotation of the motor is stopped.

The carriage 23 is supported movably in the Z direction by the two masts 22. The carriage 23 is hanged between the two masts 22. The carriage 23 is enabled to move along the masts 22 in the Z direction, by the rotation of a motor (not illustrated) serving as a driving source for moving the carriage 23 in the Z direction, and to stop at a plurality of positions in the Z direction, as the rotation of the motor is stopped.

The transfer device 24 is mounted on the carriage 23, in an extendable and retractable manner in the Y direction. The transfer device 24 has a support 24a for supporting an article A. The positions of the support 24a and the article A supported on the support 24a in the Y direction change, as the transfer device 24 is extended and retracted in the Y direction. The amount by which the transfer device 24 is extended or retracted changes depending on how much a motor (not illustrated) is rotated. In other words, the support 24a is enabled to move in the Y direction as the motor is rotated, and to stop at a plurality of positions in the Y direction, as the rotation of the motor is stopped. The support 24a in the stacker crane 20-1 is one example of a first support, and the support 24a in the stacker crane 20-2 is one example of a second support.

As illustrated in FIG. 2, when the transfer device 24 is retracted (housed therein), the support 24a and the article A are located on the transportation path S. By controlling the motor for driving the running body 21 and the masts 22, and the motor for driving the carriage 23, while the transfer device 24 is retracted, the article A is moved to and stopped at a facing position Pf facing each one of the storage compartment 1 in the transportation path S. The facing position Pf is the same as a support spot Ph where the article A is supported by the support 24a in the transportation path S. The support spot Ph in the stacker crane 20-1 is one example of a first support spot, and the support spot Ph in the stacker crane 20-2 is one example of a second support spot.

The operation for passing the article A between the support 24a and the storage spot Ps, that is, the operation of moving the article A between the facing positions Pf and the storage spot Ps may be achieved by combining the movement of the support 24a in the Y direction, and the actuation of at least a part of the transfer device 24 in a direction intersecting with the Y direction.

Explained now, as one example, is how the article A is transported under an assumption that the transfer device 24 is a known sliding fork having a plurality of members that are slidable with respect to one another in the Y direction;

the support 24a is the tip member of the sliding fork; and the transfer device 24 is configured to be movable in the Z direction in each of the storage spots Ps, without interfering with the storage compartment 1. In such a case, it is possible to pass the article A between the support 24a and the storage spot Ps, by combining a movement of the support 24a in the Y direction, being moved by causing the transfer device 24 to extend, and a movement of the support 24a in the Z direction, being moved by the carriage 23 moving in the Z direction. The transfer device 24 is enabled to move in the Y direction, and in the direction opposite to the Y direction, with respect to the transportation path S, and extendable by a length corresponding to the first storage spot Ps1 and the second storage spot Ps2, for the storage compartment 1 of the first group G1, as well as for the second group G2. To take out the article A from a storage spot Ps to the facing position Pf, the support 24a not supporting any article A is moved down to a level slightly below the level where the article A is stored in the storage spot Ps of the storage compartment 1, as the transfer device 24 is extended in the Y direction. The support 24a is then moved slightly up in the storage compartment 1, as the carriage 23 is moved in the Z direction (upwards), and picks up the article A in the storage spot Ps. The support 24a is then moved into the transportation path S along the Y direction, as the transfer device 24 is contracted into the Y direction, and moves the article A to the facing position Pf. By contrast, to carry the article A from the facing position Pf into the storage spot Ps, the support 24a supporting the article A is moved up to a level slightly above the level of the vacant storage spot Ps in the storage compartment 1, as the transfer device 24 is extended in the Y direction. The support 24a is then moved slightly down in the storage compartment 1, as the carriage 23 is moved in the direction opposite to the Z direction (downwards), and delivers (places) the article A onto the storage spot Ps. The support 24a is then moved into the transportation path S in the Y direction, as the transfer device 24 is contracted in the Y direction. The transfer device 24 may transport the article A between the support spot Ph (the facing position Pf) where the article A is supported on the transportation path S, and the first storage spot Ps1 or the second storage spot Ps2 of the storage compartments 1 that are located on both sides of the Y direction, with respect to the transportation path S.

The mechanism for transporting the article A between the support spot Ph (the facing position Pf) and each of the storage spots Ps is not limited to a sliding fork. For example, when the storage compartment 1 or the carriage 23 has a free-roller conveyor for assisting the movement of the article A in the Y direction, the article A may be moved along the free-roller conveyor via extension and contraction of the transfer device 24. In such a case, by moving a connector portion making up at least a part of the transfer device 24, in a direction intersecting with the Y direction, e.g., in the Z direction, it is possible to switch between a connected configuration in which the connector portion and the article A are connected, and a separated configuration in which the connector portion and the article A are separated from each other. In the connected configuration, the transfer device 24 may move the article A, and in the separated configuration, the transfer device 24 may not move the article A.

Furthermore, the stacker crane 20 may transport the article A between the support spot Ph and the delivery position Pd on the conveyor 4, in the same manner as between the support spot Ph and the storage spot Ps.

Operable Ranges of Stacker Cranes, and Relaying of Article

As may be clear in FIG. 1, the stacker crane 20-1 (the support 24a) and the stacker crane 20-2 (the support 24a) moving along the same guide rail 25 may not pass each other in the X direction. The X direction is one example of a second direction.

Figure 3:
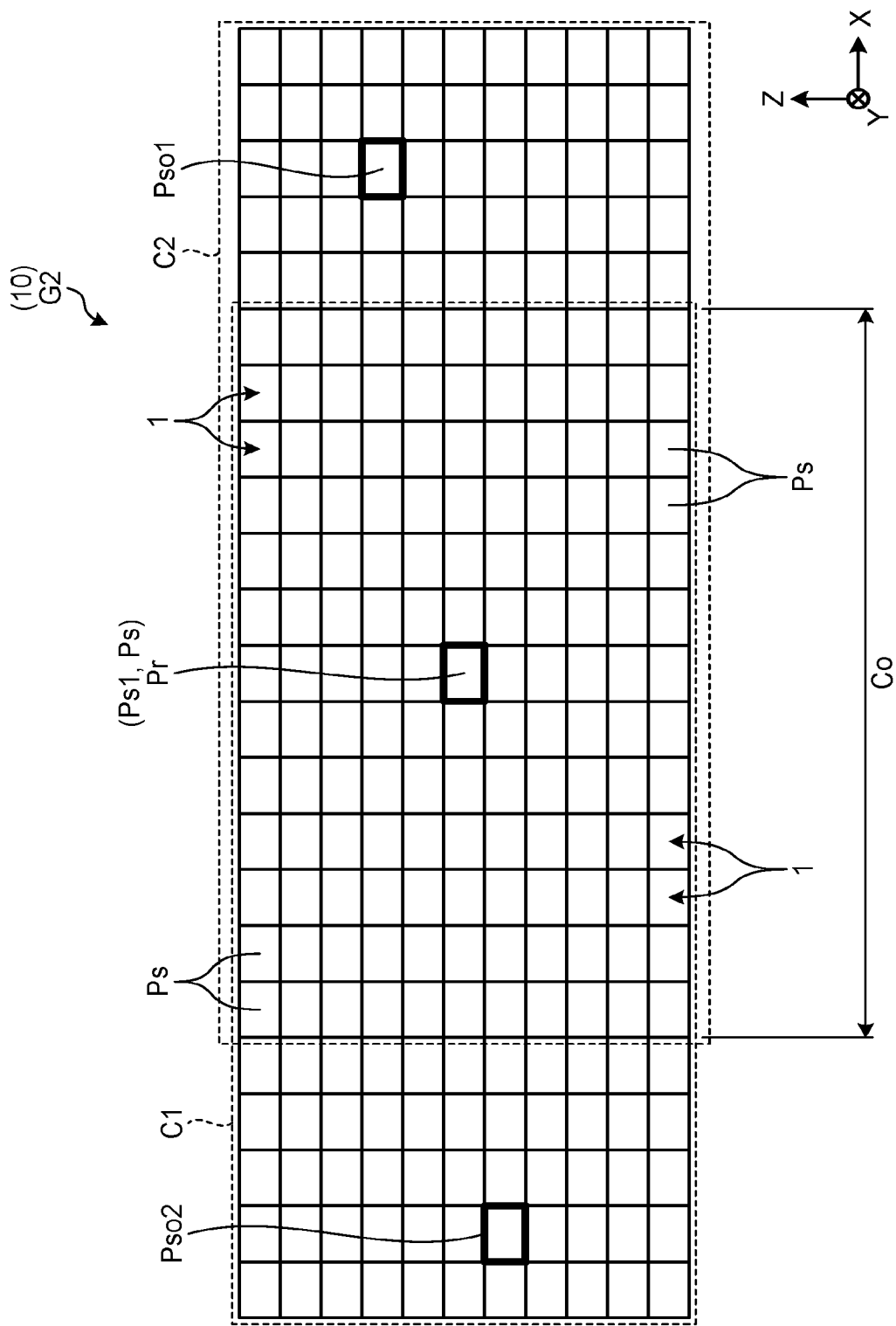
FIG. 3 is an exemplary schematic side view of storage compartments of a second group looked in a Y direction, in the cemetery facility according to the embodiment.

FIG. 3 is a side view of the storage compartments 1 of the second group G2, looked in the Y direction. In FIG. 3, each of the storage compartments 1 is illustrated as a simple rectangle. The operable ranges of the stacker cranes 20 are set so that the stacker cranes 20 do not interfere with each other. In the example illustrated in FIG. 3, the operable range C1 of the stacker crane 20-1 (not illustrated in FIG. 3) that is positioned relatively on the left side in FIG. 3 covers a range from the leftmost column to the sixth column to the left from the rightmost column of the storage compartments 1 in FIG. 3, so that the interference with the stacker crane 20-2 (not illustrated in FIG. 3) that is positioned relatively on the right side is avoided. In the same manner, the operable range C2 of the rightmost stacker crane 20-2 in FIG. 3 covers a range from the rightmost column to the sixth column to the right from the leftmost column of the storage compartments 1 in FIG. 3, so that the interference with the left stacker crane 20-1 is avoided. In FIG. 3, the operable ranges C1, C2 are indicated for the storage compartments 1 and the storage spots Ps of the second group G2, but the operable ranges C1, C2 are also set for the storage compartments 1 and the storage spots Ps of the first group G1 as ranges that substantially match the operable ranges C1, C2 illustrated, respectively, in the Y direction, for example.

In other words, the stacker crane 20-1 may not transport an article A to a storage spot Pso1 (Ps) in a storage compartment 1 included in the rightmost five columns, and the stacker crane 20-2 may not transport an article A to a storage spot Pso2 (Ps) in a storage compartment 1 included in the leftmost five columns. Furthermore, when the visitor's booth 3 is provided at one end of the X direction, for example, there is a chance that one of the stacker cranes 20 may not transport the article A to and from the delivery position Pd corresponding to the visitor's booth 3.

To address this issue, in this embodiment, as illustrated in FIG. 3, a relay spot Pr is allocated to a vacant storage spot Ps (the first storage spot Ps1) in a storage compartment 1 that is positioned within the overlapping range Co where the operable range C1 of the stacker crane 20-1 overlaps with the operable range C2 of the stacker crane 20-2. In this manner, by causing the stacker crane 20-1 to transport the article A to and from the relay spot Pr, and causing the stacker crane 20-2 to transport the article A between the relay spot Pr and the storage spot Pso1 that is outside of the operable range C1, the article A may be transported from the support 24a in the stacker crane 20-1 to the storage spot Pso1, and vice versa. In the same manner, by causing the stacker crane 20-2 to transport the article A to and from the relay spot Pr, and causing the stacker crane 20-1 to transport the article A between the relay spot Pr and the storage spot Pso2, the article A may be transported from the support 24a in the stacker crane 20-2 to the storage spot Pso2, and vice versa. The allocation of the relay spot Pr among the vacant storage spots Ps may be changed depending on how the articles A are stored in the cemetery facility 10. This topic will be described later.

Temporary Evacuation of Article

Figure 4:
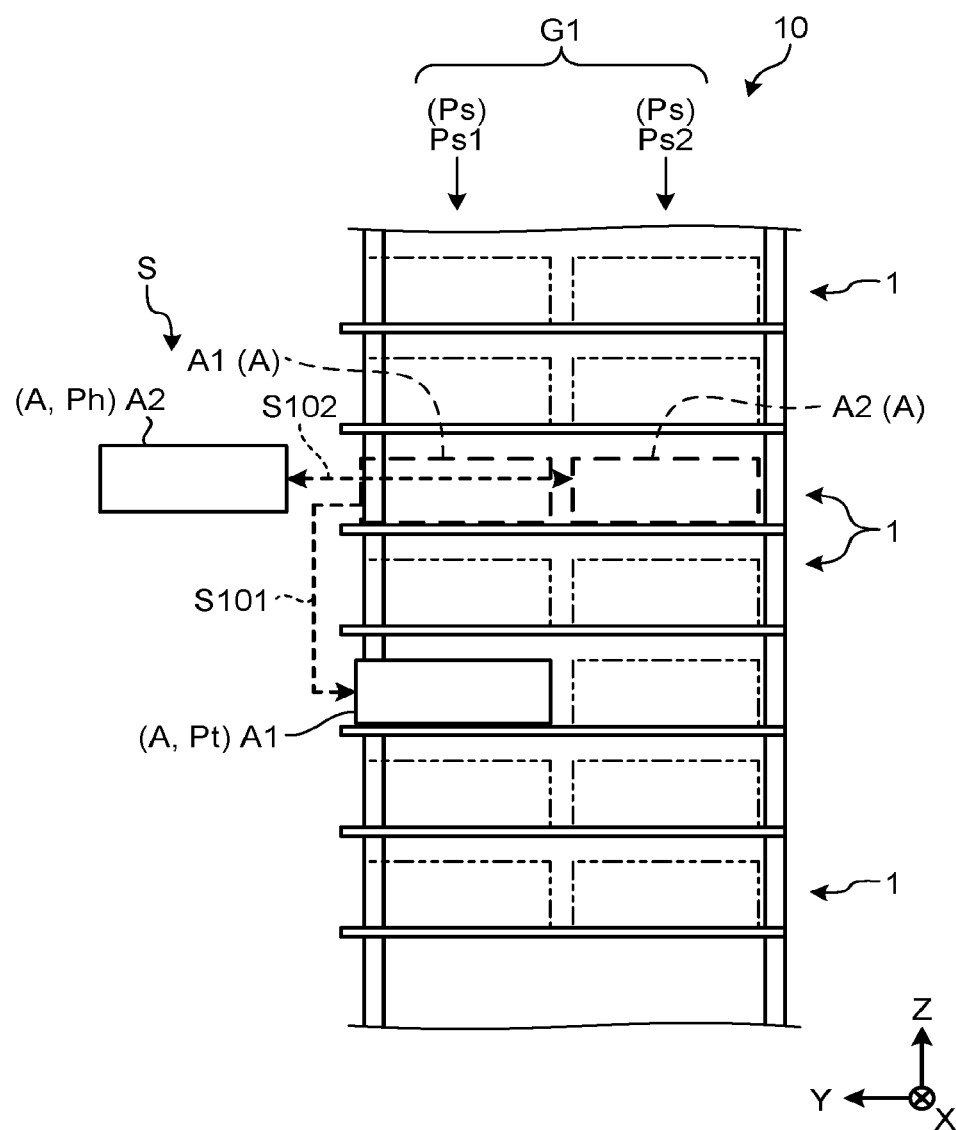
FIG. 4 is an explanatory schematic for illustrating how an article is evacuated and transported in the cemetery facility according to the embodiment.

FIG. 4 is an exemplary schematic for explaining how an article A is evacuated and transported in the cemetery facility 10. FIG. 4 illustrates a part of FIG. 2. When the stacker crane 20 transports an article A2 (A) between the support spot Ph in the transportation path S and the second storage spot Ps2, when there is another article A1 (A) stored in the first storage spot Ps1 located between the transportation path S and the second storage spot Ps2, the article A1 becomes an obstacle in transporting the article A2.

To address this issue, in this embodiment, as illustrated in FIG. 4, a temporary evacuation spot Pt is allocated to a vacant storage spot Ps where no article A is stored, and the stacker crane 20 temporarily evacuates the article A1 stored in the first storage spot Ps1 to the evacuation spot Pt (S101). In this manner, the stacker crane 20 may transport the article A2 between the second storage spot Ps2 and the support spot Ph (S102). The article A1 is one example of another article.

After the article A1 is moved to the evacuation spot Pt, this evacuation spot Pt may be allocated as a new storage spot Ps for the article A1. In such a case, the storage spot Ps of the storage compartment 1 where the article A1 has been originally stored prior to the evacuation may be allocated as a new evacuation spot Pt. With such control, the evacuation spot Pt is changed every time the evacuating operation takes place. Alternatively, the delivered article A2, having been delivered to the visiting position Po (see FIG. 1) and the evacuated article A1, having been evacuated to the evacuation spot Pt, may both be returned to the original storage compartment 1. With such control, the evacuation spot Pt remains unchanged. Furthermore, although not illustrated, when the evacuated article A1 and the delivered article A2 are to be returned to the original storage compartment 1, it is possible to put the evacuated article A1 in the second storage spot Ps2, and then to put the delivered article A2, having been delivered to the visiting position Po, in the first storage spot Ps1; or to put the delivered article A2, having been delivered to the visiting position Po, in the second storage spot Ps2, and then put the evacuated article A1 in the first storage spot Ps1. The allocation of the evacuation spot Pt corresponding to a vacant storage spot Ps may be changed depending on how the articles A are stored in the cemetery facility 10. This topic will be described later.

Control Device

Figure 5:
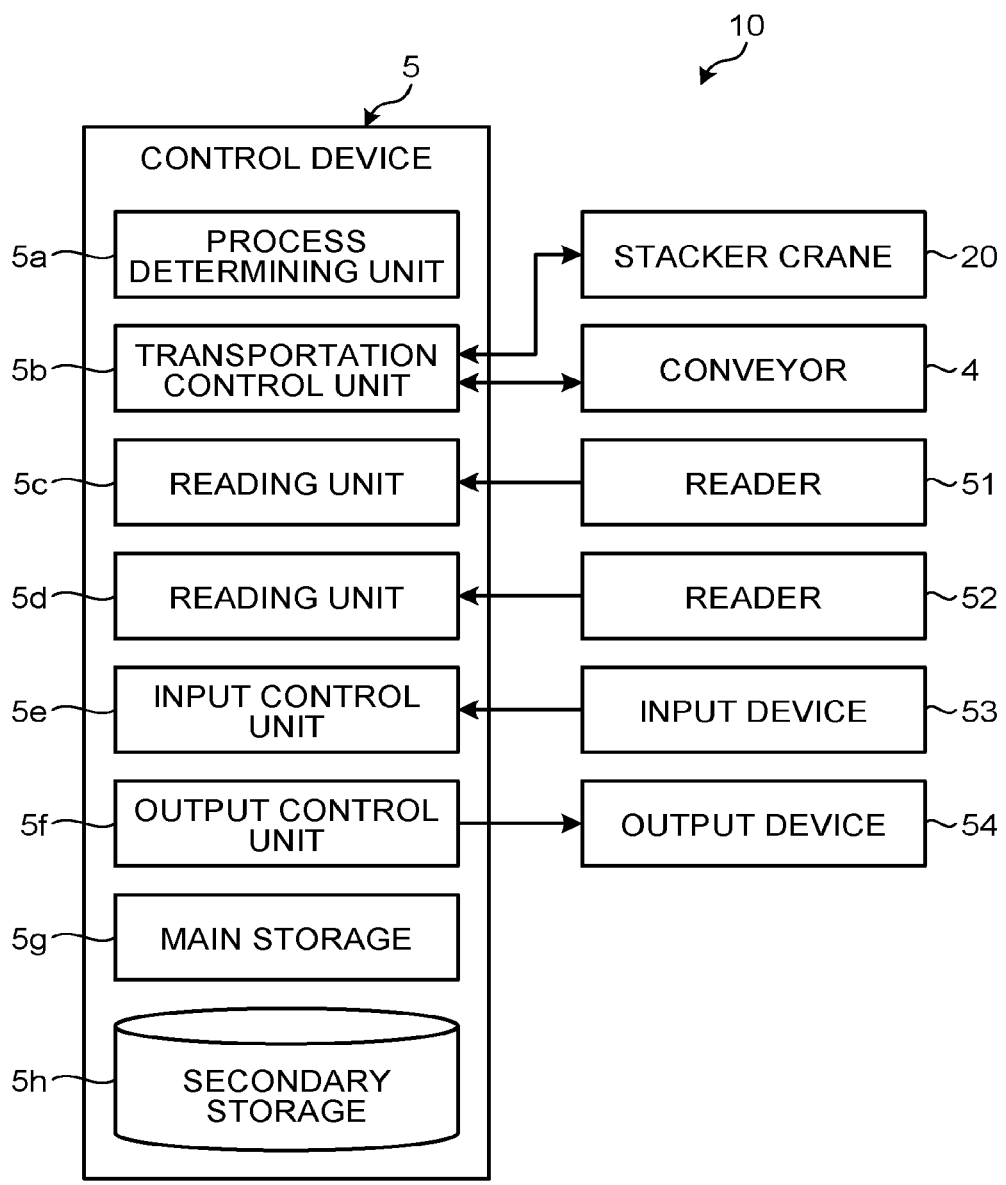
FIG. 5 is a block diagram of the cemetery facility according to the embodiment.

FIG. 5 is a block diagram of the cemetery facility 10. As illustrated in FIG. 5, the cemetery facility 10 includes a control device 5. The control device 5 includes a process determining unit 5a, a transportation control unit 5b, reading units 5c, 5d, an input control unit 5e, and an output control unit 5f.

The process determining unit 5a determines a processing sequence to be performed by the stacker cranes (20-1, 20-2) and the conveyors 4 working together as the transportation mechanisms, allocations of the articles A to the storage spots Ps, allocations (assignments) of the relay spot Pr and the evacuation spots Pt to the storage spots Ps, and allocation (assignment) of a temporary placement compartment 1i (to be described later) to the storage compartment 1, for example.

The transportation control unit 5b controls to cause the stacker cranes 20 (20-1, 20-2) and the conveyors 4 to operate in accordance with the processing sequence and the allocations determined by the process determining unit 5a.

The reading unit 5c acquires information read by the reader 51, and the reading unit 5d acquires information read by the reader 52.

The input control unit 5e acquires the information entered via an input device 53, such as a touch panel, a switch, a button, or a keyboard.

The output control unit 5f controls to cause an output device 54, such as a display, a lamp, or a speaker, to make a predetermined output.

The control device 5 may be implemented as a computer. The computer includes at least a processor (circuit), a main storage 5g, such as a random access memory (RAM) and a read-only memory (ROM), and a secondary storage 5h, such as a hard disk drive (HDD) or a solid state drive (SSD), and the processor reads a computer program (application) stored in the ROM that is the main storage 5g, or the secondary storage 5h, and executes the computer program. The processor operates as the process determining unit 5a, the transportation control unit 5b, the reading units 5c, 5d, the input control unit 5e, and the output control unit 5f, by making operations in accordance with a computer program. In such a case, the computer program includes program modules corresponding to the process determining unit 5a, the transportation control unit 5b, the reading units 5c, 5d, the input control unit 5e, and the output control unit 5f. The secondary storage 5h stores therein identification information of the articles A stored in the storage spots Ps, identification information of the article A temporarily retained in the storage spot Ps for the purpose of relaying or evacuation, attribute information of the articles A stored in the cemetery facility 10 (hereinafter, referred to as an article database), allocations of the relay spot Pr and the evacuation spots Pt to the storage spots Ps, and information indicating an allocation of the temporary placement compartment 1i (to be described later) to the storage compartment 1. The process determining unit 5a overwrites these pieces of information, as appropriate, for example.

The computer program may be provided in a computer-readable recording medium, as a file in an installable or executable format. The recording medium may be referred to as a computer program product. Furthermore, the computer program may be installed to the computer by downloading the computer program stored in a storage unit of another computer connected to a communication network, via the network. Furthermore, the computer program may be incorporated in the ROM or the like in advance.

Furthermore, when at least a part of the computer is implemented as hardware, the computer may include a field-programmable gate array (FPGA) or an application-specific integrated circuit (ASIC), for example.

The ROM included in the main storage 5g or the secondary storage 5h stores therein information used in the operations performed by the process determining unit 5a, the transportation control unit 5b, the reading units 5c, 5d, the input control unit 5e, and the output control unit 5f. The information used in the operations may also described in the computer program.

Processing Sequence of Visiting

Figure 6:
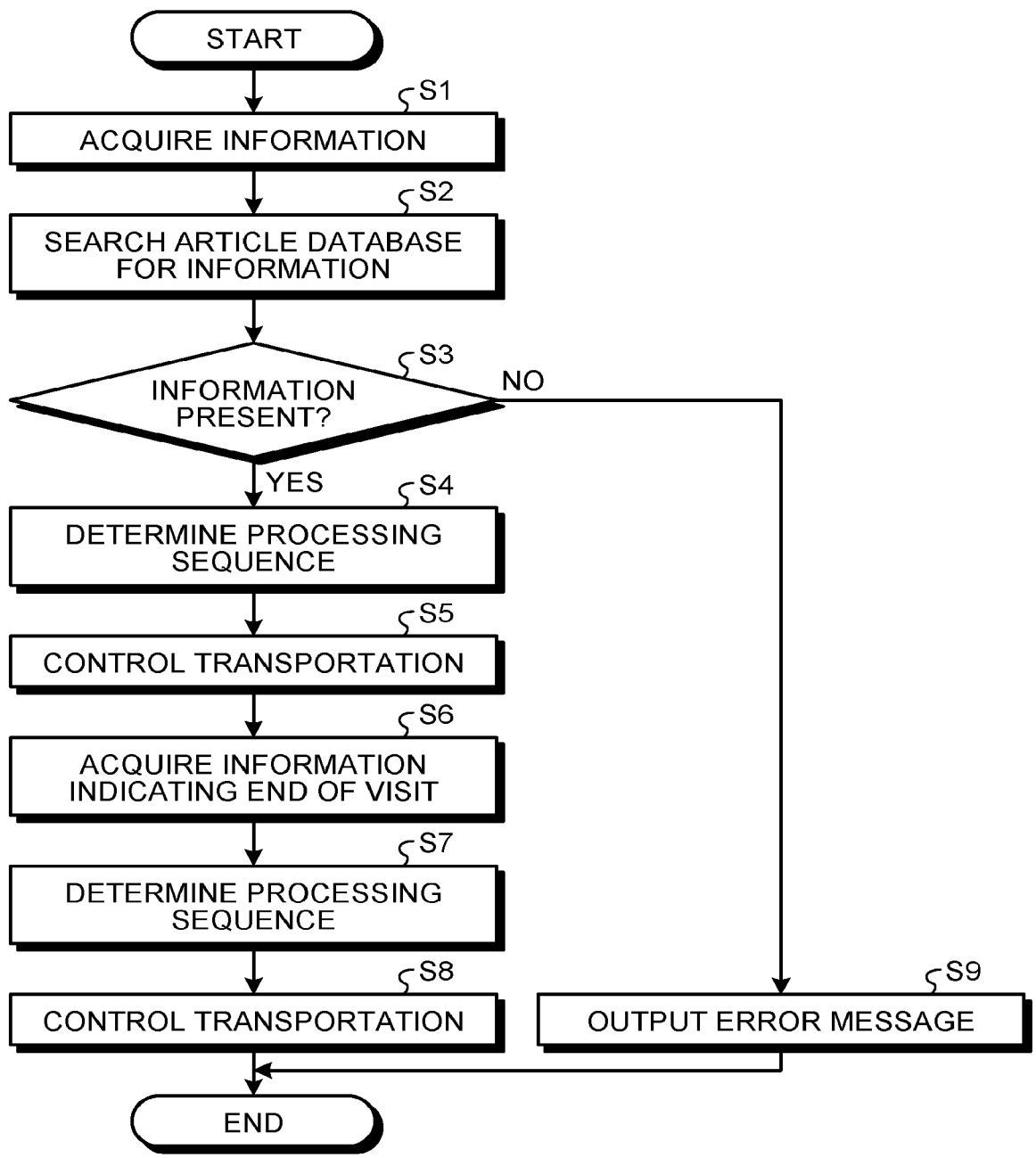
FIG. 6 is a flowchart illustrating one example of the sequence of a process when visiting the cemetery facility according to the embodiment.

FIG. 6 is a flowchart illustrating one example of the sequence of a process when visiting the cemetery facility. In the example illustrated in FIG. 6, when the reading unit 5d in a predetermined start-standby condition acquires information corresponding to a detection signal from the reader 52 provided to the visitor's booth 3, or when the input control unit 5e acquires the information input from the input device 53 (S1), the process determining unit 5a searches the article database for the information acquired at Step S1 (S2). The information acquired at Step S1 is attribute information of the article A, such as the identification information of the visitor.

As a result of the search executed at Step S2, if the article database has the information acquired at Step S1, and if it is determined that the article A corresponding to the information acquired at Step S1 is present in the cemetery facility 10 (Yes at S3), the process determining unit 5a determines the processing sequence for transporting the article A from the corresponding storage spot Ps to the visiting position Po inside the corresponding visitor's booth 3 (S4). The processing sequence will be described later in detail. At Step S4, the process determining unit 5a may be configured to allocate the relay spot Pr and the evacuation spot Pt to the storage spots Ps.

The transportation control unit 5b then controls the stacker cranes 20-1, 20-2 and the conveyor 4, so that the article A is transported from the corresponding storage spot Ps to the visiting position Po, in accordance with the allocation and the processing sequence determined at Step S4 (S5). The input control unit 5e then transits to the standby condition for acquiring information indicating the end of the visit.

When the visitor finishes the visit, and the input control unit 5e acquires the information indicating the end of the visit corresponding to visitor's operation on the input device 53 (S6), the transportation control unit 5b determines which storage spot Ps the article A is to be returned, and the processing sequence used to transport the article A from the visiting position Po to the storage spot Ps (S7). At Step S7, the process determining unit 5a may determine the storage spot Ps for storing the article A transported at Step S5.

The transportation control unit 5b then controls the stacker cranes 20-1, 20-2 and the conveyor 4 to transport the article A from the visiting position Po to the storage spot Ps, in accordance with the determination and the processing sequence at Step S7 (S8).

In the search executed at Step S2, if the article database does not have the information acquired at Step S1 (No at S3), the output control unit 5f controls to cause the display, the speaker, or the like to output an error message (S9).

Through Step S8 or Step S9 described above, the sequence of a series of processes is ended. The transportation control unit 5b may also determine the transportation sequence for returning the article A, at Step S4. In such a case, Step S7 is omitted, and the transportation control unit 5b controls, at Step S8, to cause the stacker cranes 20-1, 20-2 and the conveyor 4 to transport the article A from the visiting position Po to the storage spot Ps, in accordance with the allocation and the processing sequence determined at Step S4.

Control Mode

The cemetery facility 10 may execute the control for transporting the article A in two different control modes (a first control mode and a second control mode) in which the relay spot Pr and the evacuation spots Pt are allocated to the storage spots Ps in different ways. The control device 5 may switch the control between the first control mode and the second control mode, selectively.

1. Control Mode with High Storage Ratio (First Control Mode)

FIGS. 7 to 10 are side views of a part of the storage compartments 1 in the first group G1 and the conveyor 4, looked in the X direction, and are explanatory schematics for illustrating one example of how the article A is moved in the first control mode. In the example illustrated in FIGS. 7 to 10, the storage compartments 1a, 1b storing therein the articles A1, A2, the temporary placement compartment 1i, and the delivery position Pd are all aligned the Z direction, but the control explained below may also be applied to any arrangement other than that in this example. In other words, at least one of the storage compartment 1a, the storage compartment 1b, the temporary placement compartment 1i, and the delivery position Pd (the conveyor 4) may be located offset from the others in at least one of the X direction, the Y direction, and the Z direction, with respect to the layout illustrated in FIGS. 7 to 10. Furthermore, at least one of the storage compartments 1a, 1b and the temporary placement compartment 1i may be located in the second group G2. Furthermore, explained in the example illustrated in FIGS. 7 to 10 is how the article A is moved between the storage compartment 1 and the delivery position Pd (taken out from the storage compartment 1 to the delivery position Pd, and returned from the delivery position Pd to the storage compartment 1), but the control explained below may also be applied when the article A is moved between two different storage compartments 1.

In the description herein, the ratio of the storage spots Ps storing therein articles A, with respect to the entire storage spots Ps will be referred to as a storage ratio. When the storage ratio is higher than a predetermined threshold, the transportation control unit 5b performs a process in the first control mode in which the temporary placement compartment 1i is allocated to one of the storage compartments 1, and in which the storage spot Ps included in the temporary placement compartment 1i is allocated as at least one of the relay spot Pr and the evacuation spot Pt. If separate storage compartments 1 are to be allocated dedicatedly to the relay spot Pr and to the evacuation spot Pt, the number of the storage compartments 1 available for the storage of the articles A becomes smaller. In the first control mode, because one storage compartment 1 is allocated as the temporary placement compartment 1i, and the temporary placement compartment 1i is used for the relay spot Pr and the evacuation spot Pt, that is, because both of the relay spot Pr and the evacuation spot Pt are allocated to the storage spots Ps included in the one temporary placement compartment 1i, it is possible to increase the number of storage compartments 1 available for storage of the articles A. In this embodiment, the evacuation spot Pt serves as a first evacuation spot Pt1 used in the transportation of the article A by the stacker crane 20-1, as well as a second evacuation spot Pt2 used in the transportation of the article A by the stacker crane 20-2. Furthermore, the threshold is set to 90%, for example. In the operation in which the process determining unit 5a compares the ratio against the threshold, it is possible to set a threshold correspondingly to the number of articles A being stored.

1-1. Relaying Transportation and Evacuation of Articles

To begin with, transportation of the article A2 stored in the second storage spot Ps2 of the storage compartment 1a (1) to a visitor's booth 3 (a delivery position Pd), via the relay spot Pr will now be explained with reference to FIGS. 7 to 10. In the explanation herein, it is assumed that the temporary placement compartment 1i is allocated to the storage compartment 1b (1).

1-2. Sequence of Evacuation and Relaying Transportation

Figure 7:
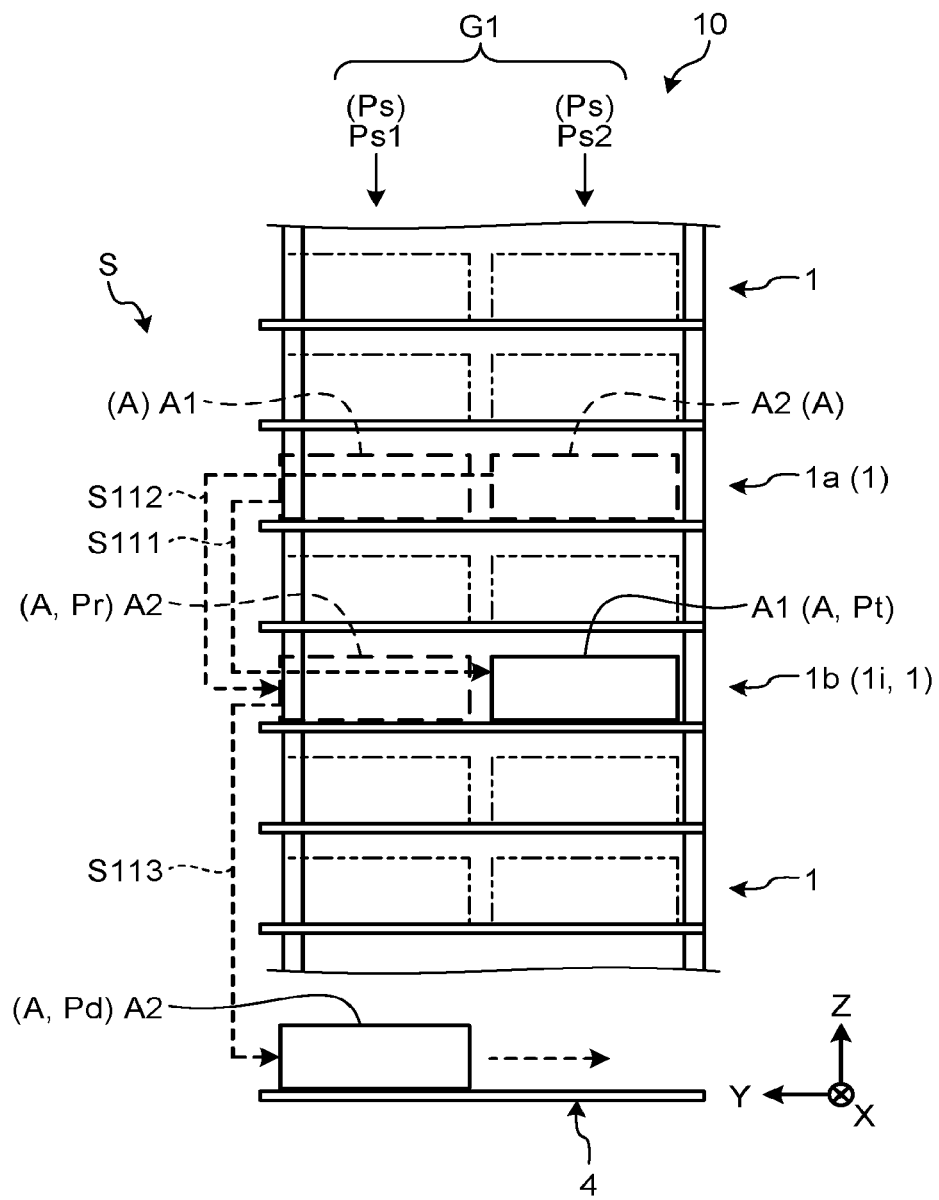
FIG. 7 is an explanatory schematic for illustrating one example of how an article is moved before the visit ends, in a first control mode of the cemetery facility according to the embodiment.

FIG. 7 illustrates one example of how the articles A1, A2 are moved when the article A2 is to be transported from the second storage spot Ps2 before the visit ends. As illustrated in FIG. 7, because the article A1 is stored in the first storage spot Ps1 of the storage compartment 1a, the article A1 needs to be evacuated before the article A2 is transported. Therefore, the article A1 to be evacuated is first taken out from the storage compartment 1a, and the article A2 to be relayed and to be transported is then taken out. In the first control mode, the relay spot Pr and the evacuation spot Pt are allocated to the same temporary placement compartment 1i (the storage compartment 1b), as mentioned earlier. Therefore, the article A1 and the article A2 being stored in the storage compartment 1a are both carried into the same temporary placement compartment 1i. In other words, the process determining unit 5a allocates the second storage spot Ps2 of the temporary placement compartment 1i as the evacuation spot Pt for the article A1 to be taken out first from the storage compartment 1a, and allocates the first storage spot Ps1 of the temporary placement compartment 1i as the relay spot Pr for the article A2 to be taken out later from the storage compartment 1a.

In such a case, to begin with, as illustrated in FIG. 7, the stacker crane 20-1 (not illustrated in FIG. 7) transports the article A1 stored in the first storage spot Ps1 to the evacuation spot Pt (the second storage spot Ps2) of the temporary placement compartment 1i (S111), and then transports the article A2 stored in the second storage spot Ps2 to the relay spot Pr (the first storage spot Ps1) of the temporary placement compartment 1i (S112). The stacker crane 20-2 (not illustrated in FIG. 7) then transports the article A2 placed in the relay spot Pr to the delivery position Pd (S113).

1-3-1. Sequence for Returning Articles (with Change in Temporary Placement Compartment)

To return the article A2 to the storage compartment 1 after the visit ends, the articles A1, A2 are transported differently, depending on whether the allocation of the temporary placement compartment 1i is to be changed.

Figure 8:
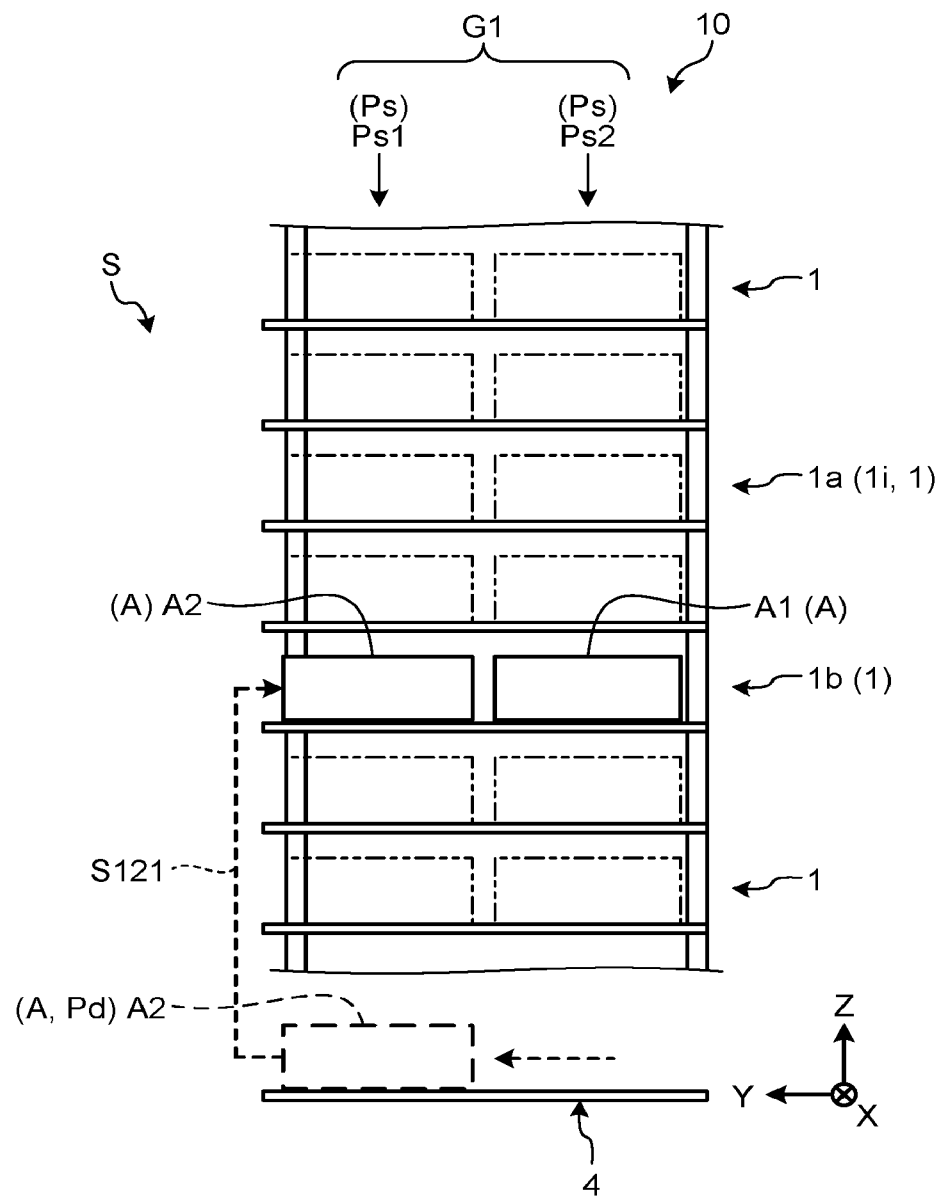
FIG. 8 is an explanatory schematic for illustrating one example of how the article is moved after the visit ends, in the first control mode of the cemetery facility according to the embodiment.

To begin with, an example in which the allocation of the temporary placement compartment 1i is to be changed will now be explained. FIG. 8 illustrates one example of how the articles A1, A2 are moved in the process of carrying (returning) the article A2 into the storage spot Ps after the visit ends. As illustrated in FIG. 8, because the article A1 has been evacuated and the article A2 has been transported to the visitor's booth 3, the first storage spot Ps1 and the second storage spot Ps2 of the storage compartment 1a are vacant, without storing therein any articles A. When this storage compartment 1a in which the first storage spot Ps1 and the second storage spot Ps2 are both vacant is within the overlapping range Co (see FIG. 3), it is possible to allocate this storage compartment 1a as a new temporary placement compartment 1i. In other words, it is possible to change the temporary placement compartment 1i from the storage compartment 1b to the storage compartment 1a. The conditions for changing the temporary placement compartment 1i will be described later. When the temporary placement compartment 1i is to be changed from the storage compartment 1b to the storage compartment 1a, the articles A1, A2 may be stored in the storage compartment 1b, having previously served as the temporary placement compartment 1i. In the example illustrated in FIG. 8, the evacuated article A1 is located in the second storage spot Ps2 of the storage compartment 1b. Therefore, it is possible to store the article A1 in the second storage spot Ps2, and store the article A2 in the first storage spot Ps1. The storage compartment 1a in this example is one example of a vacant storage compartment.

In other words, the process determining unit 5a changes the allocation of the temporary placement compartment 1i from the storage compartment 1b to the storage compartment 1a, allocates the second storage spot Ps2 of the storage compartment 1b as the storage spot for the article A1, and allocates the first storage spot Ps1 of the storage compartment 1b as the storage spot for the article A2.

As illustrated in FIG. 8, the stacker crane 20-2 (not illustrated in FIG. 8) then carries the article A2 from the delivery position Pd into the first storage spot Ps1 of the storage compartment 1b (S121).

1-3-2. Sequence for Returning Articles (with No Change in Temporary Placement Compartment and Storage Spots)

An example in which the allocation of the temporary placement compartment 1i is not changed (maintained) will now be explained. As one example, the articles A1, A2 may be returned to the original storage compartment 1a, by reversing the processes at S111 to S113.

Figure 9:
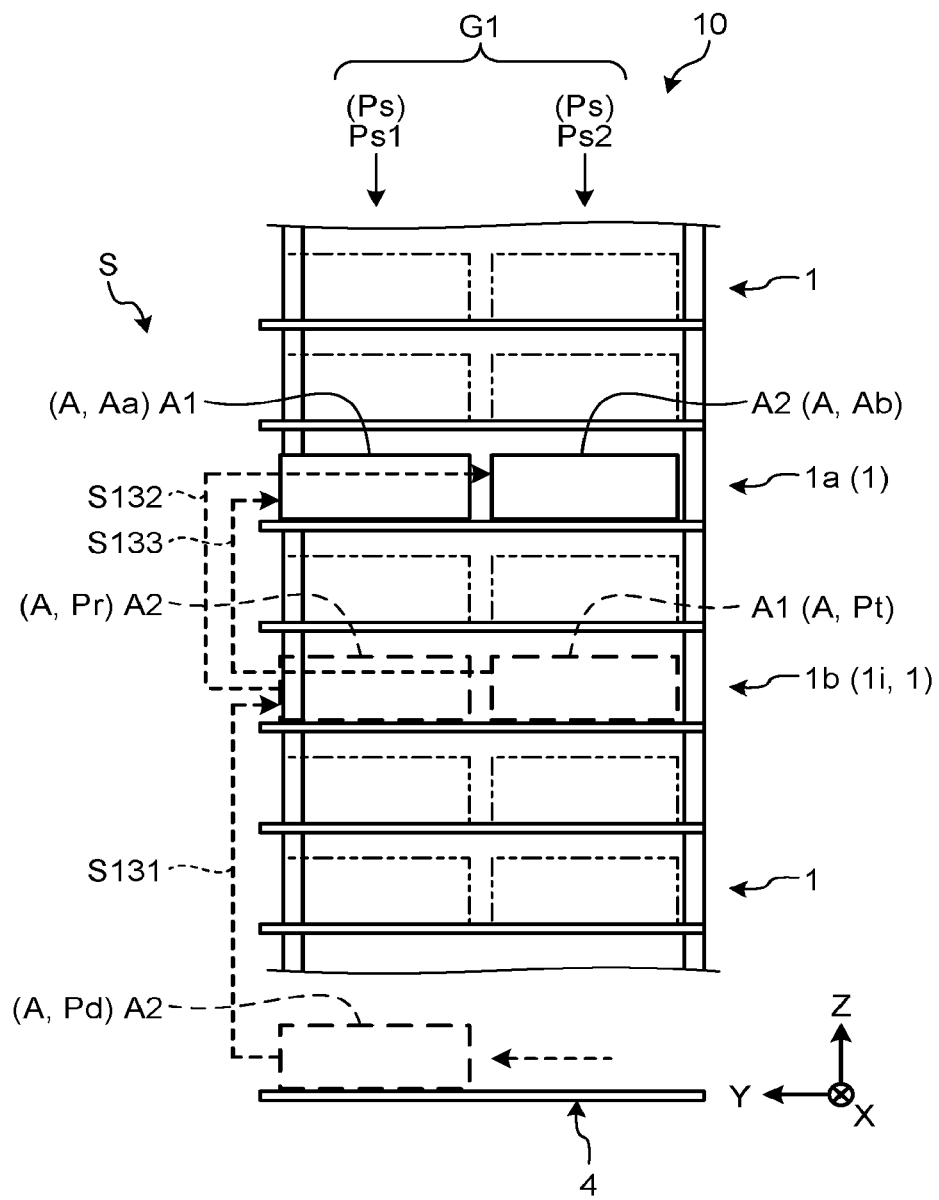
FIG. 9 is an explanatory schematic for illustrating another example of how the article is moved after the visit ends, in the first control mode of the cemetery facility according to the embodiment.

FIG. 9 illustrates one example of how the articles A1, A2 are moved in the process of carrying (returning) the article A2 into the storage spot Ps after the visit ends, in this example. As illustrated in FIG. 9, the stacker crane 20-2 (not illustrated in FIG. 9) transports the article A2 from the delivery position Pd to the relay spot Pr (the first storage spot Ps1) of the temporary placement compartment 1i (S131). The stacker crane 20-1 (not illustrated in FIG. 9) then transports article A2 from the relay spot Pr to the second storage spot Ps2 in the storage compartment 1a (S132). The stacker crane 20-1 then transports the article A1 from the evacuation spot Pt (the second storage spot Ps2) of the temporary placement compartment 1i to the first storage spot Ps1 of the storage compartment 1a (S133). In this example, the articles A1, A2 are both returned to the storage spots Ps where the articles A1, A2 are originally stored before being taken out. To put it in other words, the storage spots Ps for the articles A1, A2 are remain unchanged.

1-3-3. Sequence for Returning Articles (with No Change in Temporary Placement Compartment, and with Change in Storage Spots)

As another example, even when the allocation of the temporary placement compartment 1i is not changed, it is also possible to switch (change) the storage spots Ps for the articles A1, A2 when the articles A1, A2 are returned to the original storage compartment 1a. The conditions for changing the storage spots Ps will be described later.

In this case, the process determining unit 5a allocates the first storage spot Ps1 of the storage compartment 1a as storage spot of the article A2, and allocates the second storage spot Ps2 in the storage compartment 1a as the storage spot of the article A1.

Figure 10:
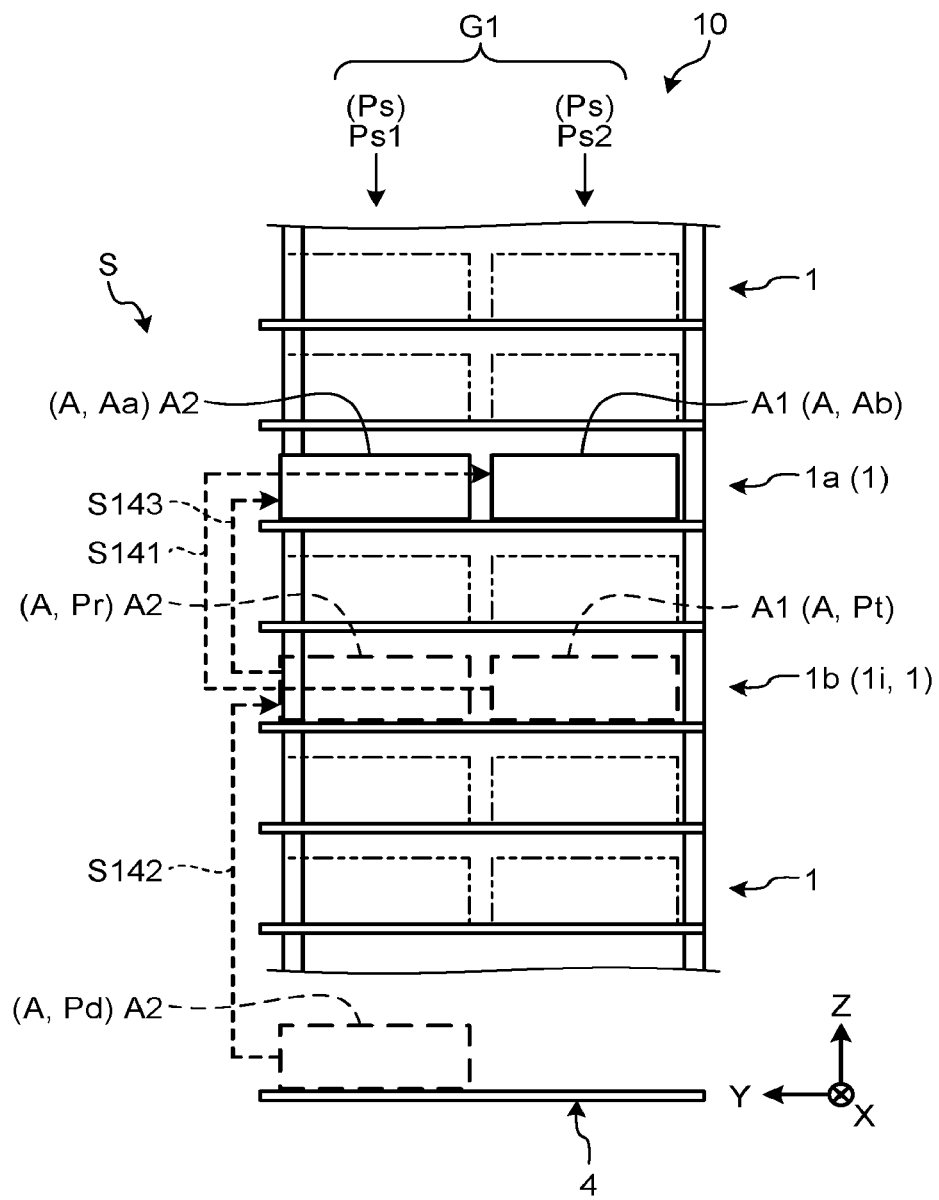
FIG. 10 is an explanatory schematic for illustrating still another example of how the article is moved after the visit ends, in the first control mode of the cemetery facility according to the embodiment.

FIG. 10 illustrates one example of how the articles A1, A2 are moved in the process of carrying (returning) the article A2 into the storage spot of Ps after the visit ends. As illustrated in FIG. 10, the stacker crane 20-1 (not illustrated in FIG. 10) transports the article A1 from the evacuation spot Pt (the second storage spot Ps2) of the temporary placement compartment 1i to the second storage spot Ps2 of the storage compartment 1a (S141). The stacker crane 20-2 (not illustrated in FIG. 10) then transport the article A2 from the delivery position Pd to the relay spot Pr (the first storage spot Ps1) of the temporary placement compartment 1i (S142). The stacker crane 20-1 then transports the article A2 from the relay spot Pr to the first storage spot Ps1 of the storage compartment 1a (S143).

1-4. Conditions for Changing Storage Spots

The process determining unit 5a may determine the storage spots Ps for the articles A1, A2, for example, based on the schedule when the articles A1, A2 are to be taken out. For example, the process determining unit 5a acquires the time and the date on which the articles A1, A2 are to be taken out (carry-out schedule) by referring to the article database, and allocates the storage spots Ps for the articles A1, A2 in the storage compartment 1 in such a manner that the first storage spot Ps1 is assigned to an article Aa (A, see FIGS. 9 and 10), which is one of the articles A1, A2, for which the time between the execution of this operation and the scheduled carry-out time and date is shorter, and that the second storage spot Ps2 is assigned to an article Ab (A, see FIG. 9, 10), which is the other one of the articles A1, A2, for which the time between the execution of this operation and the scheduled carry-out time and date is longer.

Therefore, the storage spots Ps are not switched (changed) in the process of returning the articles A1, A2 to the storage spots Ps if the article A1 originally located at the first storage spot Ps1 is the article Aa, and the article A2 originally located at the second storage spot Ps2 is the article Ab; if the schedules are unknown for both of the articles A1, A2; or if the time from the execution of this operation to the scheduled carry-out time and date is substantially the same between the articles A1, A2 (e.g., the difference is equal to or less than a predetermined time; specifically, equal to or less than a few hours). By contrast, if the article A1 is the article Ab and the article A2 is the article Aa, the storage spots Ps are switched (changed) from those before the articles A1, A2 are carried out.

1-5. Condition for Changing Temporary Placement Compartment

Figure 11:
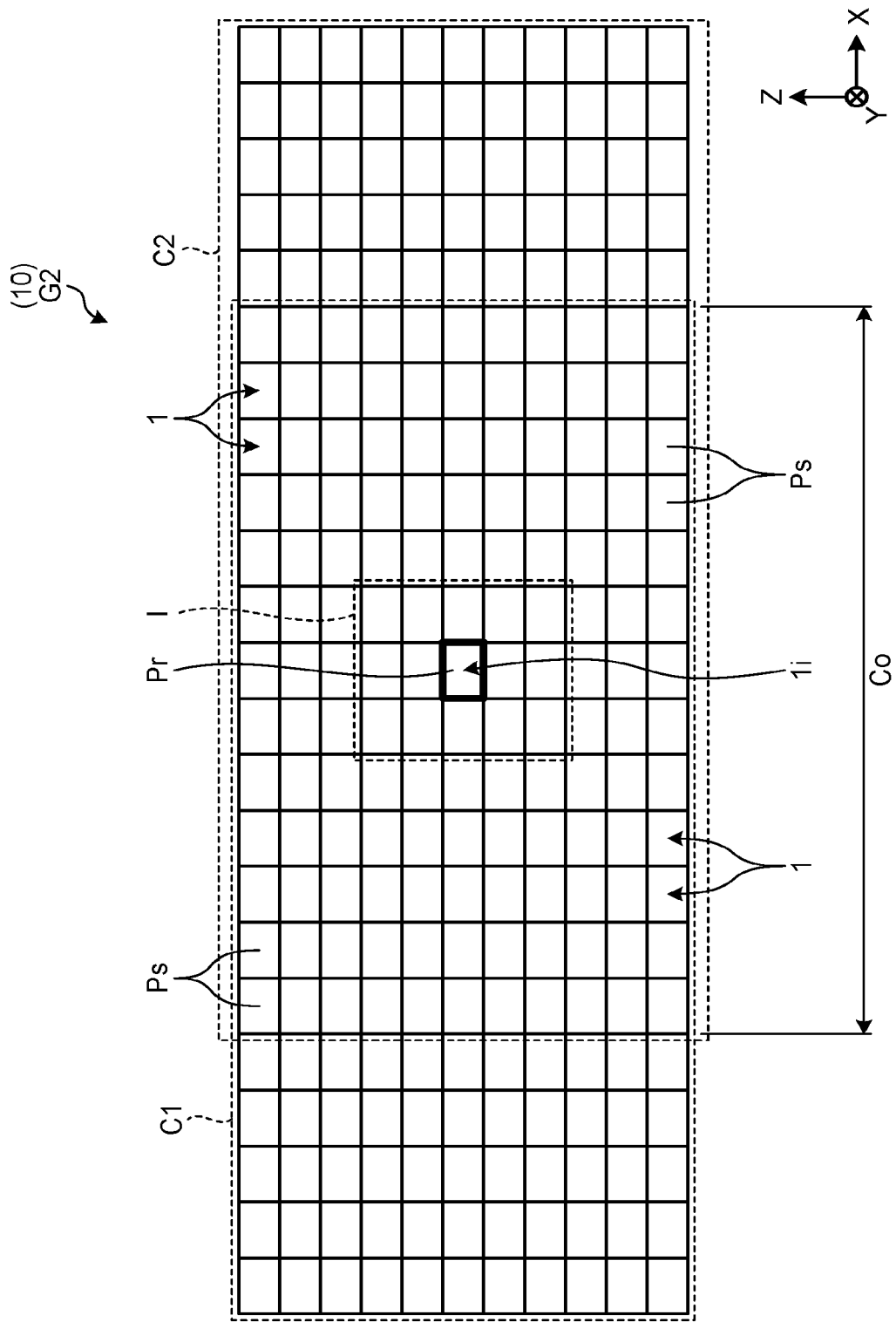
FIG. 11 is a schematic and exemplary side view of the storage compartments of the second group looked in the Y direction, in the cemetery facility according to the embodiment, and is an explanatory schematic for illustrating an allocable range of a temporary placement compartment in the first control mode.

FIG. 11 is a side view of the storage compartments 1 in the second group G2, looked in the Y direction, and is an explanatory schematic for illustrating a range I where the allocation of the temporary placement compartment 1i is permitted. In FIG. 11, each of the storage compartments 1 is illustrated as a simple rectangle. As illustrated in FIG. 11, in the first control mode, it is possible to limit the range I where the allocation of the temporary placement compartment 1i is permitted, to the central parts in the X direction and the Z direction. As described earlier, the relay spot Pr is allocated to the temporary placement compartment 1i. When the storage spot Ps is near an end of the X direction, the stacker crane 20-1 (not illustrated in FIG. 11) and the stacker crane 20-2 (not illustrated in FIG. 11) need to relay the article A. If the temporary placement compartment 1i, to which the relay spot Pr is allocated, is away from the central part in the X direction and near an end in the X direction, it is highly likely that the distance by which the support 24a is moved to transport the article A between the storage spot Ps and the relay spot Pr becomes too long or too short. When the distance by which the support 24a is moved is too long, the movement needs a longer time compared with when the distance is short. When the distance by which the support 24a is moved is too short, the movement takes a longer time, because the speed of the movement does not increase. If the temporary placement compartment 1i, to which the relay spot Pr is allocated, is allocated within the allocable range I set to the central part in the X direction, it is less likely for the distance between the storage spot Ps and the relay spot Pr to be too long or too short. Therefore, it is possible to shorten the time to move the article A when the stacker crane 20-1 and the stacker crane 20-2 relay the article A. As illustrated in FIG. 11, the allocable range I is also set to the central part in the Z direction. With this allocation, it is less likely for the distance between the storage spot Ps and the relay spot Pr to be too long. Therefore, the time to move the article A may be shortened even more. The allocable range I is one example of a predetermined range. The Z direction is one example of a third direction.

If the vacant storage compartment 1a (see FIG. 8), being vacant because the article A1 has been evacuated therefrom and the article A2 has been carried out from the second storage spot Ps2, is located within the allocable range I, the process determining unit 5a may change the temporary placement compartment 1i to the storage compartment 1a, that is, may allocate the storage compartment 1a as the temporary placement compartment 1i. When the temporary placement compartment 1i is not changed, the process of transporting the articles A1, A2 to the original storage compartment 1a needs to be performed, as illustrated in FIGS. 9 and 10. As illustrated in FIGS. 7 and 8, if the temporary placement compartment 1i is to be changed from the storage compartment 1b to the storage compartment 1a, the time for the series of processes to complete may be reduced, by the amount of time in transporting (returning) the evacuated article A1 to the storage spot Ps of the original temporary placement compartment 1i that is the storage compartment 1b (FIG. 7).

Furthermore, if the vacant storage compartment 1a, being vacant because the article A1 has been evacuated therefrom and the article A2 has been carried out from the second storage spot Ps2, is located outside of the allocable range I, the process determining unit 5a keeps the allocation of the temporary placement compartment 1i as it is, that is, keeps the allocation of the temporary placement compartment 1i without changing. With this allocation, it is less likely for the distance between the storage spot Ps and the relay spot Pr to become too long or too short, and therefore, the time to relay the article A may be shortened even more.

1-6. Sequence of Transportation with None of Evacuation and Relaying Operation

When it is possible to transport the article A2 without relaying, the temporary placement compartment 1i (the storage compartment 1b) is not used as the relay spot Pr but used as the evacuation spot Pt. In this case, too, if the vacant storage compartment 1a, being vacant because the article A1 has been evacuated therefrom and the article A2 has been carried out from the second storage spot Ps2, is located within the allocable range I, the process determining unit 5a changes the temporary placement compartment 1i to the storage compartment 1a, that is, allocates the storage compartment 1a as the temporary placement compartment 1i, as explained in [1-5]. If the vacant storage compartment 1a, being vacant because the article A1 has been evacuated therefrom and the article A2 has been carried out from the second storage spot Ps2, is located outside of the allocable range I, the process determining unit 5a keeps the allocation of the temporary placement compartment 1i as it is, that is, keeps the allocation of the temporary placement compartment 1i without changing.

Furthermore, when the temporary placement compartment 1i is not changed, the process determining unit 5a allocates the first storage spot Ps1 of the temporary placement compartment 1i (the storage compartment 1b) as the evacuation spot Pt. In this manner, because it is possible to shorten the travelling distance between the support spot Ph in the transportation path S and the storage spot Ps, compared with when the evacuation spot Pt is allocated to the second storage spot Ps2, it is possible to shorten the time for the article A to move to the evacuation spot Pt, and to shorten the return time for the article A to move from the evacuation spot Pt to the storage spot Ps, even more.

By contrast, when the temporary placement compartment 1i is to be changed, the process determining unit 5a allocates the second storage spot Ps2 of the temporary placement compartment 1i (the storage compartment 1b) as the evacuation spot Pt. When the temporary placement compartment 1i is to be changed from the storage compartment 1b to the storage compartment 1a, the articles A1, A2 are carried into the storage compartment 1b after the visit ends, and are stored therein. If the first storage spot Ps1 of the temporary placement compartment 1i (the storage compartment 1b) is allocated as the evacuation spot Pt, the process will be more cumbersome because the process of transporting the evacuated article A1 to the second storage spot Ps2 is necessary. In this embodiment, because the second storage spot Ps2 of the temporary placement compartment 1*i* (the storage compartment 1*b*) is allocated as the evacuation spot Pt, it is possible to store the articles A1, A2 in the storage compartment 1*b* more quickly, merely by transporting the article A2 to the first storage spot Ps1.

With this first control mode, because a larger number of storage compartments 1 may be made available as the storage for the articles A, compared with when the relay spot Pr and the evacuation spot Pt are allocated to the storage spots Ps in the separate storage compartments 1, it is possible to increase the maximum number of articles A which may be stored in the cemetery facility 10. To put it in other words, it is possible to reduce wasted (vacant) storage compartments 1 and storage spots Ps in the cemetery facility 10.

2. Control Mode with Low Storage Ratio (Second Control Mode)

When the storage ratio is lower than the predetermined threshold, the process determining unit 5*a* performs a process in the second control mode, by using a fixed relay spot Pr fixed to the storage spot Ps of the one storage compartment 1, and allocating the evacuation spot Pt to a storage spot Ps of another storage compartment 1 that is different from the storage compartment 1 allocated with the relay spot Pr.

Figure 12:
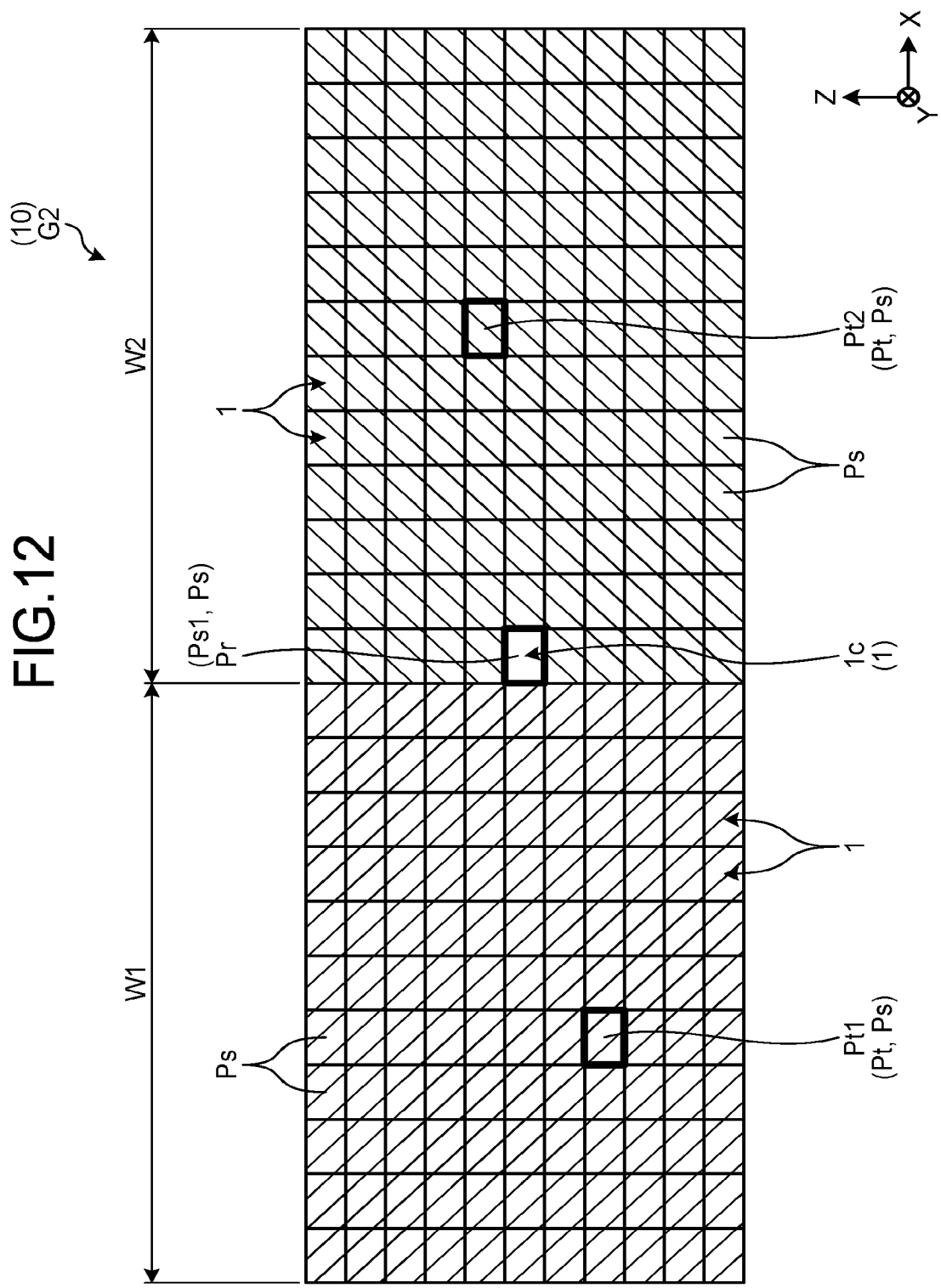
FIG. 12 is a schematic and exemplary side view of the storage compartments of the second group looked in the Y direction, in the cemetery facility according to the embodiment, and is an explanatory schematic for illustrating how a relay spot and an evacuation spot are allocated in the second control mode.

FIG. 12 is a side view of the storage compartments 1 of the second group G2, looked in the Y direction, and is an explanatory schematic for illustrating one example of the allocation of the relay spot Pr and the evacuation spot Pt in the second control mode. In FIG. 12, each of the storage compartments 1 is illustrated as a simple rectangle. In the second control mode, as illustrated in FIG. 12, an operable range W1 of the stacker crane 20-1 (not illustrated in FIG. 12) and an operable range W2 of the stacker crane 20-2 (not illustrated in FIG. 12) are defined in the X direction. The operable ranges W1, W2 are ranges where the stacker cranes 20-1, 20-2 are set to transport the articles A. In FIG. 12, the operable range W1 is indicated as hatched with a plurality of diagonals running upwards toward the left, and the operable range W2 is indicated as hatched with a plurality of diagonals running upwards toward the right. The relay spot Pr is allocated to the border between the operable ranges W1, W2, and is excluded from the operable ranges W1, W2.

In the second control mode, the relay spot Pr is fixed to the first storage spot Ps1 of a storage compartment 1*c* (1) located at the central part in the X direction and the Z direction. The article A is passed between the two stacker cranes 20-1, 20-2 via the relay spot Pr illustrated in FIG. 12.

By using a fixed relay spot Pr in the manner described above, because the operation for changing the relay spot Pr is not necessary, the operation of the process determining unit 5*a* becomes more simplified. Furthermore, because the relay spot Pr is located at the central part in the X direction, it is less likely that the distance between the storage spot Ps and the relay spot Pr becomes too long or too short, and the time to move the article A may be shortened even more. Furthermore, because the relay spot Pr is located at the central part in the Z direction, it is less likely that the distance between the storage spot Ps and the relay spot Pr becomes too long, the time to move the article A may be shortened even more.

The relay spot Pr may be set to a spot adjacent to or near the storage spot Ps located at the center in the X direction, or may be allocated to a spot adjacent to or near the storage spot Ps located at the center in the Z direction. Furthermore, for example, the relay spot Pr may be allocated to a spot located at the central part in one of the X direction and the Z direction, and offset from the central part in the other direction.

In the second control mode, as illustrated in FIG. 12, the relay spot Pr, the evacuation spot Pt (the first evacuation spot Pt1) used in the transportation by the stacker crane 20-1, and the evacuation spot Pt (the second evacuation spot Pt2) used in the transportation by the stacker crane 20-2 are all allocated to different storage spots Ps. The stacker cranes 20-1, 20-2 may transport the article A to any storage spots Ps of the storage compartments 1 that are located within the respective operable ranges W1, W2. Furthermore, both of the stacker cranes 20-1, 20-2 may transport the article A to the relay spot Pr. In FIG. 12, the operable ranges W1, W2 and the relay spot Pr are allocated to the storage compartments 1 and the storage spots Ps of the second group G2, but the operable ranges W1, W2 and the relay spot Pr are also allocated to the storage compartments 1 and the storage spots Ps of the first group G1, within the ranges substantially matching the illustrated operable ranges W1, W2 and the relay spot Pr in the Y direction, for example.

By defining the operable range W1 of the stacker crane 20-1 and the operable range W2 of the stacker crane 20-2 in the X direction in the manner described above, it is possible to ensure that the support 24*a* in the stacker crane 20-1 is separated from the support 24*a* in the stacker crane 20-2, more easily. Therefore, the process determining unit 5*a* may reduce the number of operations performed to avoid interference between these supports, so that the operation load of the process determining unit 5*a* may be reduced further, advantageously. With a configuration enabled to control the stacker cranes 20-1, 20-2 in parallel, the transportation efficiency may be improved, advantageously. Furthermore, by allocating the first evacuation spot Pt1, the second evacuation spot Pt2, and the relay spot Pr separately, it is less likely for the distance by which the support 24*a* is moved between the first evacuation spot Pt1, the second evacuation spot Pt2, and the relay spot Pr, and the storage spot Ps to become too long, it is possible to shorten the time to transport the article A.

When the storage ratio is equal to the threshold, the process determining unit 5*a* performs the process in one of the first control mode and the second control mode.

As described above, in the cemetery facility 10 (article storage facility) according to the embodiment, the control device 5 allocates a storage spot Ps of the temporary placement compartment 1*i* (one storage compartment 1) between which both of the stacker crane 20-1 (the first transportation mechanism) and the stacker crane 20-2 (the second transportation mechanism) may transport the article A, as at least one of the evacuation spot Pt serving as both of the first evacuation spot Pt1 and the second evacuation spot Pt2, and the relay spot Pr.

With such a configuration and control, it is possible to increase the number of storage compartments 1 available for storage of the articles A, compared with when the evacuation spot Pt and the relay spot Pr are allocated to storage spots Ps of separate storage compartments 1. Therefore, it is possible to increase the maximum number of articles A which may be stored in the cemetery facility 10.

Furthermore, in the cemetery facility 10 according to the embodiment, for example, the control device 5 may selectively perform control in the first control mode in which a storage spot Ps of the temporary placement compartment 1*i* is allocated as at least one of the evacuation spot Pt and the relay spot Pr, and control in the second control mode in which the storage spots Ps of the storage compartments 1 that are different from one another are allocated as the relay spot Pr, the first evacuation spot Pt1, and the second evacuation spot Pt2.

With such a configuration and control, the cemetery facility 10 may increase the maximum number of articles A which may be stored by using the control in the first control mode, and may also improve the efficiency of transporting the articles A by using the control in the second control mode.

Furthermore, in the cemetery facility 10 according to the embodiment, for example, the control device 5 performs the control in the first control mode when the storage ratio (the ratio of the number of storage spots Ps storing therein the articles A, with respect to the number of the entire storage spots Ps) is higher than a threshold (predetermined value), and performs the control in the second control mode when the storage ratio is lower than the threshold.

In the cemetery facility 10, when the storage ratio of the articles A is relatively low, because the cemetery facility 10 has some allowance for storing more articles A, that is, has some vacant storage spots Ps, the priority of increasing the number of maximum storages is not very high. Therefore, with such a configuration and control, by performing the control in the second control mode instead of the control in the first control mode, it is possible to increase the efficiency of transporting the articles A, while avoiding the problem of insufficiency in the maximum number of storages, when the storage ratio is lower than the threshold.

Furthermore, in the cemetery facility 10 according to the embodiment, for example, the control device 5 in the second control mode keeps the allocation of the relay spot Pr fixed to the storage spot Ps of the storage compartment 1 that is located at the central part in the X direction, among the plurality of storage compartments 1.

With such a configuration and control, because the relay spot Pr is fixed to the central part in the X direction, it is possible to shorten the time in relaying the article A between the two stacker cranes 20-1, 20-2 even further, so that the efficiency of transporting the articles A may be improved further. Furthermore, because the operation for changing the relay spot Pr is not necessary, the operation of the control device 5 becomes more simplified, and, as a result, the processing load may also be reduced, advantageously.

Furthermore, in the cemetery facility 10 according to the embodiment, for example, the control device 5 in the second control mode keeps the allocation of the relay spot Pr fixed to the storage spot Ps of the storage compartment 1 that is located at the central part in the Z direction (third direction), among the plurality of storage compartments 1.

With such a configuration and control, because the relay spot Pr is fixed to the central part in the Z direction, it is possible to shorten the time in relaying the article A between the two stacker cranes 20-1, 20-2 even further, so that the efficiency of transporting the articles A may be improved further. Furthermore, because the operation for changing the relay spot Pr is not necessary, the operation of the control device 5 becomes more simplified, and, as a result, the processing load may also be reduced, advantageously.

Furthermore, in the cemetery facility 10 according to the embodiment, for example, the control device 5 in the first control mode may allocate the first storage spot Ps1 of the temporary placement compartment 1i as the relay spot Pr, and allocate the second storage spot Ps2 of the temporary placement compartment 1i as the evacuation spot Pt.

With such a configuration and control, even when it is necessary to evacuate the article A1 in the storage compartment 1, and to relay the article A2 in the storage compartment 1, it is possible to perform the evacuation of the article A1 and the relaying of the article A2, using two storage spots Ps provided in one temporary placement compartment 1i.

Furthermore, in the cemetery facility 10 according to the embodiment, for example, the support 24a in the stacker crane 20-1 (the first support) and the support 24a in the stacker crane 20-2 (second support) are not allowed to pass each other in the X direction (second direction), and the control device 5 in the first control mode may allocate a storage spot Ps of the temporary placement compartment 1i located at the center in the X direction (second direction) within the allocable range I (predetermined range), as at least one of the evacuation spot Pt and the relay spot Pr, among the plurality of storage compartments 1.

If the relay spot Pr is away from the central part of the storage compartments 1 in the X direction, the distance by which the support 24a in one of the two stacker cranes 20-1, 20-2 is moved to the facing position Pf corresponding to the relay spot Pr becomes longer, and the distance by which the support 24a of the other is moved to the facing position Pf become shorter. If the distance by which the support 24a is moved is too long, the time in the movement becomes longer, and if the distance by which the support 24a is moved is too short, the movement needs a longer time, because the speed of the support 24a does not increase. With the configuration and the control according to the embodiment, because the relay spot Pr of the temporary placement compartment 1i is kept at the center of the allocable range I in the X direction, it is possible to shorten the time in relaying the article A between the two stacker cranes 20-1, 20-2 even further, so that the efficiency of transporting the articles A may be improved further.

One embodiment of the present disclosure has been explained above, but the embodiment is just one example, and is not intended to limit the scope of the present disclosure in any way. The embodiment described above may be implemented in various other forms, and various types of omissions, replacements, combinations, or modifications are still possible within the scope not deviating from the essence of the present disclosure. Furthermore, specifications such as configurations or shapes (including structures, types, directions, models, sizes, lengths, widths, thickness, heights, numbers, arrangements, positions, and materials) may be changed in the implementation as appropriate.

For example, the article storage facility according to the present disclosure is not limited to the cemetery facility, but may also be applied to other facilities such as an automated warehouse facility, a library collection storage facility, and a safe deposit box facility. Furthermore, the article storage facility according to the present disclosure is not limited to a facility storing therein articles for a relatively long term, but may also be applied to facilities in which articles are kept temporarily, or facilities where the kept articles are swapped relatively frequently, for example.

Furthermore, the articles are not limited to containers. When the articles are containers, the article storage facility may also be configured to manage the status of the content of the containers.

Furthermore, the number of exits and entries of the articles provided to the article storage facility, and the layout thereof may be designed variously.

Furthermore, the article storage facility may also include a plurality of transportation mechanisms capable of passing each other in the second direction. In such a case, too, the present disclosure may be applied to a plurality of transportation mechanisms requiring to relay articles, or to a plurality of transportation mechanisms not permitted to pass one another in the second direction. Furthermore, the transportation mechanism is not limited to a stacker crane, and may be a self-propelling trolley having an elevator device, for example.

Furthermore, in the embodiment described above, the storage spots of the temporary placement compartment are allocated as the first evacuation spot, the second evacuation spot, and the relay spot, but the embodiment is not limited thereto, and it is also possible to allocate the storage spots of the temporary placement compartment as one of the first evacuation spot and the second evacuation spot, and as the relay spot. In such a case, the other one of the first evacuation spot and the second evacuation spot is allocated to a storage spot of another storage compartment that is different from the temporary placement compartment.

Furthermore, in the embodiment described above, the relay spot used in the second control mode is located at the central part in the second direction and the third direction, but the embodiment is not limited thereto, and the relay spot may be located at least at a central part in the second direction, e.g., the relay spot may be allocated within a range of the third direction at the central part in the second direction.

Furthermore, the threshold for the storage ratio at which the first control mode and the second control mode are switched is not limited to the ratio described in the embodiment, and may be set in a variable manner.

Furthermore, it is not mandatory to switch the first control mode to the second control mode, and vice versa, based on the comparison of the storage ratio with the threshold. The first control mode and the second control mode may also be switched manually, or switched based on a parameter different from the storage ratio, for example. Furthermore, it is also possible to switch among a setting in which only the control in the first control mode is performed, a setting in which only the control in the second control mode is performed, and a setting in which the control in the first control mode and the control in the second control mode may be performed selectively, depending on the season, occasions, or the time of a day.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An article storage facility comprising:
    a plurality of storage compartments provided along a transportation path extending in a direction intersecting with a first direction, each of the plurality of storage compartments including
        a first storage spot configured to store a first article; and
        a second storage spot located on an opposite side of the transportation path with respect to the first storage spot in the first direction and configured to store the first article;
    a first transportation mechanism including a first support configured to support and transport the first article along the transportation path, the first transportation mechanism being configured to transport the first article between: each one of the first and the second storage spots; and a first support spot where the first article is supported by the first support in the transportation path;
    a second transportation mechanism including a second support configured to support and transport the first article along the transportation path, the second transportation mechanism being configured to transport the first article between: each one of the first and the second storage spots; and a second support spot where the first article is supported by the second support in the transportation path; and
    a controller configured to control transportation of the first article by the first transportation mechanism and the second transportation mechanism, wherein the controller is configured to allocate a third storage spot in one of the plurality of storage compartments to and from which both of the first transportation mechanism and the second transportation mechanism are able to transport the first article, as at least one of
        a first evacuation spot to which the first transportation mechanism evacuates a second article in a case where the second article is placed in the first storage spot located between the first support spot and the second storage spot when transporting the first article between the first support spot and the second storage spot by the first transportation mechanism,
        a second evacuation spot to which the second transportation mechanism evacuates the second article in a case where the second article is placed in the first storage spot located between the second support spot and the second storage spot when transporting the first article between the second support spot and the second storage spot by the second transportation mechanism, and
        a relay spot where the first article is supported while the first article is passed between the first transportation mechanism and the second transportation mechanism.

2. The article storage facility according to claim 1, wherein the controller is configured to selectively perform:
    control in a first control mode for allocating the third storage spot as at least one of: the first evacuation spot; the second evacuation spot; and the relay spot; and
    control in a second control mode for designating each of the first evacuation spot, and the second evacuation spot and the relay spot to a storage spot in the storage compartment different from each another.

3. The article storage facility according to claim 2, wherein the controller is configured to:
    perform the control in the first control mode when a ratio of number of the first and the second storage spots storing the first articles, with respect to total number of the first and the second storage spots is higher than a predetermined value; and
    perform the control in the second control mode when the ratio is lower than the predetermined value.

4. The article storage facility according to claim 2, wherein
    the first support and the second support are configured to be movable in a second direction that extends along the transportation path and configured to be prohibited from passing each other in the second direction, and
    the controller is configured to, in the second control mode, keep an allocation of the relay spot fixed to the storage spot in one of the plurality of storage compartments located at a central part in the second direction.

5. The article storage facility according to claim 4, wherein
    the first support and the second support are configured to be movable in a third direction that extends along the transportation path, the third direction being perpendicular to the second direction, and the controller is configured to, in the second control mode, keep an allocation of the relay spot fixed to the storage spot in one of the plurality of storage compartments located at a central part in the third direction.

6. The article storage facility according to claim 1, wherein the controller is configured to allocate the first storage spot in one of the plurality of storage compartments to and from which both of the first transportation mechanism and the second transportation mechanism are able to transport the first article as the relay spot, and allocate the second storage spot in the one of the plurality of storage compartments as at least one of the first evacuation spot and the second evacuation spot.

7. The article storage facility according to claim 1, wherein the first support and the second support are configured to be movable in a second direction that extends along the transportation path, and configured to be prohibited from passing each other in the second direction, and the controller is configured to allocate a storage spot in one of the plurality of storage compartments located within a predetermined range at a center in the second direction, as at least one of the first evacuation spot, the second evacuation spot, and the relay spot.

* * * * *